(12) United States Patent
Bachmann et al.

(10) Patent No.: US 10,276,851 B2
(45) Date of Patent: Apr. 30, 2019

(54) BATTERY COMPRISING A NUMBER OF INDIVIDUAL CELLS CONNECTED ELECTRICALLY TO ONE ANOTHER AND METHOD FOR MAINTAINING, REPAIRING AND/OR OPTIMIZING SUCH A BATTERY

(71) Applicants: Daimler AG, Stuttgart (DE); Norbert Bachmann, Dettingen (DE); Tillmann Hoefer, Wendlingen (DE); Rainer Kaufmann, Stuttgart (DE); Jens Meintschel, Bernsdorf (DE); Rudolf Reinhardt, Esslingen (DE); Dirk Schroeter, Winnenden (DE); Heiko Steinmetz, Ohmden (DE)

(72) Inventors: Norbert Bachmann, Dettingen (DE); Tillmann Hoefer, Wendlingen (DE); Rainer Kaufmann, Stuttgart (DE); Jens Meintschel, Bernsdorf (DE); Rudolf Reinhardt, Esslingen (DE); Dirk Schroeter, Winnenden (DE); Heiko Steinmetz, Ohmden (DE)

(73) Assignee: Daimler AG, Stuttgart (DE)

( * ) Notice: Subject to any disclaimer, the term of this patent is extended or adjusted under 35 U.S.C. 154(b) by 835 days.

(21) Appl. No.: 14/363,425

(22) PCT Filed: Oct. 2, 2012

(86) PCT No.: PCT/EP2012/004134
§ 371 (c)(1),
(2) Date: Jun. 6, 2014

(87) PCT Pub. No.: WO2013/083213
PCT Pub. Date: Jun. 13, 2013

(65) Prior Publication Data
US 2014/0363704 A1   Dec. 11, 2014

(30) Foreign Application Priority Data

Dec. 7, 2011  (DE) .................. 10 2011 120 470

(51) Int. Cl.
*H01M 2/20*   (2006.01)
*H01M 2/26*   (2006.01)
(Continued)

(52) U.S. Cl.
CPC ............. *H01M 2/206* (2013.01); *H01M 2/26* (2013.01); *H01M 10/42* (2013.01);
(Continued)

(58) Field of Classification Search
CPC .. H01M 10/42; H01M 10/4257; H01M 10/48; H01M 10/482; H01M 2/206; H01M 2/26; H01M 2010/4271; H01M 2220/20
See application file for complete search history.

(56) References Cited

U.S. PATENT DOCUMENTS

2011/0159353 A1\* 6/2011 Byun ................ H01M 2/206
 429/160
2011/0236728 A1   9/2011 Uchida et al.
2012/0328920 A1\* 12/2012 Takase .............. H01M 2/1077
 429/90

FOREIGN PATENT DOCUMENTS

JP            8-64191 A      3/1996
JP   WO 2011111678 A1 \*   9/2011   .......... H01M 2/1077
(Continued)

OTHER PUBLICATIONS

Machine translation of Japanese Patent Publication No. JP 2011/249243, published Dec. 8, 2011.\*
(Continued)

*Primary Examiner* — Sarah A. Slifka
*Assistant Examiner* — Lilia Nedialkova
(74) *Attorney, Agent, or Firm* — Crowell & Moring LLP

(57) ABSTRACT

A battery includes a number of single cells interconnected in series and/or in parallel, the electrical poles of which for the electrical interconnection are connected to one another in a positive-fit and/or integrally bonded manner, directly or by means of cell connectors. The battery also includes a battery monitoring unit connected to the electrical poles and/or to the cell connectors in a positive-fit and/or integrally bonded manner. The electrical poles of the single cells, the cell connectors, and/or the battery monitoring unit have redundant contact areas for the positive-fit and/or integrally bonded connection. In each case only one of the contact areas which are redundant with one another is connected in a positive-fit and/or integrally bonded manner, and the further contact area(s) is/are not connected.

9 Claims, 26 Drawing Sheets

Figure 1:
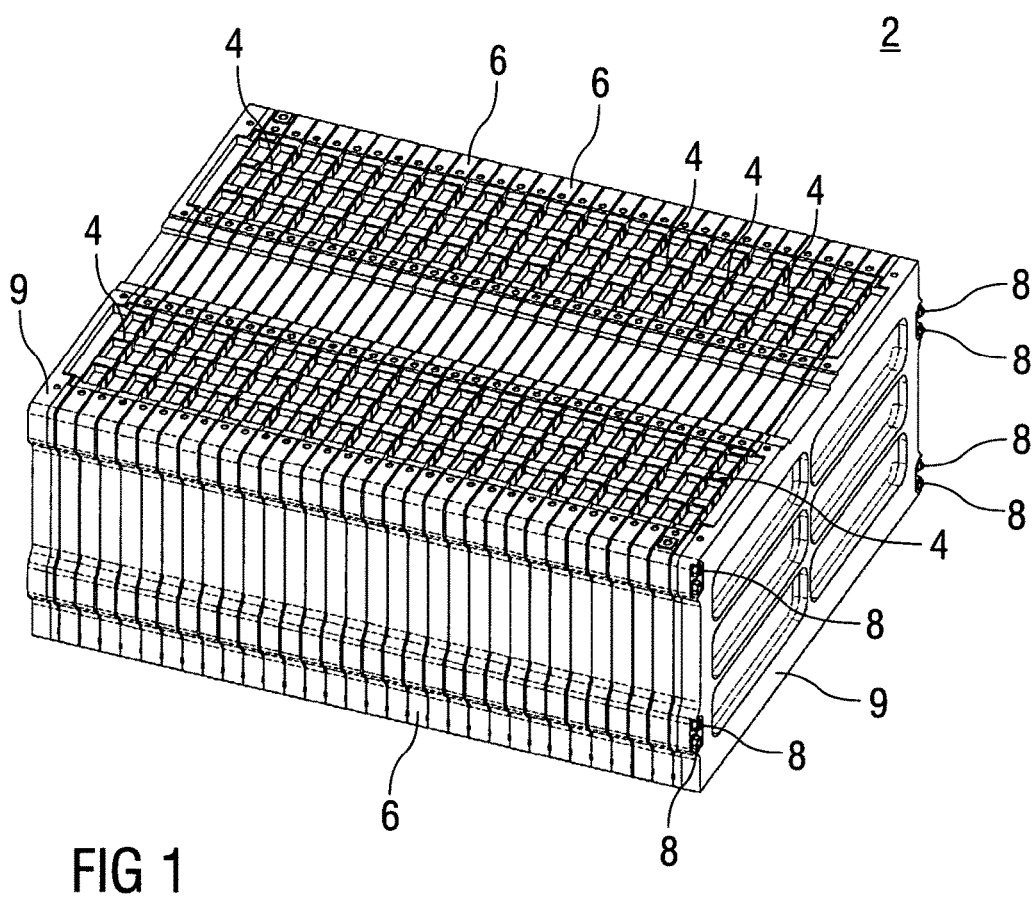

(51) Int. Cl.
*H01M 10/42* (2006.01)
*H01M 10/48* (2006.01)

(52) U.S. Cl.
CPC ....... *H01M 10/4257* (2013.01); *H01M 10/48* (2013.01); *H01M 10/482* (2013.01); *H01M 2010/4271* (2013.01); *H01M 2220/20* (2013.01)

(56) References Cited

FOREIGN PATENT DOCUMENTS

| JP | 2011-249243 A | 12/2011 |
| WO | WO 2008/128764 A1 | 10/2008 |
| WO | WO 2011/123808 A2 | 10/2011 |

OTHER PUBLICATIONS

Japanese Office Action issued in counterpart Japanese Application No. 2014-545119 dated Jul. 28, 2015, with partial English translation (Seven (7) pages).
International Search Report (PCT/ISA/220 & PCT/ISA/210) dated Dec. 5, 2012 with English translation (8 pages).
German-language Written Opinion (PCT/ISA/237) dated Dec. 5, 2012 (6 pages).

* cited by examiner

BATTERY COMPRISING A NUMBER OF INDIVIDUAL CELLS CONNECTED ELECTRICALLY TO ONE ANOTHER AND METHOD FOR MAINTAINING, REPAIRING AND/OR OPTIMIZING SUCH A BATTERY

BACKGROUND AND SUMMARY OF THE INVENTION

Exemplary embodiments of the invention relate to a battery having a number of single cells interconnected in series and/or in parallel, the electrical poles of which for the electrical interconnection are connected to one another in a positive-fit and/or integrally bonded manner, directly or by means of cell connectors, and having a battery monitoring unit, the battery monitoring unit being connected to the electrical poles and/or to the cell connectors in a positive-fit and/or integrally bonded manner. The invention further relates to a method for servicing, repairing, and/or optimizing such a battery.

Electrochemical high-voltage batteries for automotive applications are generally known from the prior art, and are formed from multiple single cells that are electrically interconnected in parallel and/or in series. For electrically connecting the single cells in series, their electrical poles are connected directly via an electrically conductive cell connector. In addition, the electrical poles of the particular single cell and/or the cell connectors are electrically connected to a device for measuring cell voltage and for charge balancing. The device for measuring cell voltage and for charge balancing is generally combined for multiple single cells in a battery electronics system. The electrical poles of the single cells are contacted with the cell connectors and the electrical poles, and/or the cell connector is contacted with the device for measuring cell voltage and for charge balancing, using integral bonding processes such as laser welding, resistance pressure welding, ultrasonic welding, and/or by means of positive-fit methods such as tox clinching/clinching or crimping. These integrally bonded and/or positive-fit connections, which are established ensure the particular function over the service life of the battery (even under high mechanical, corrosive, and/or thermal stress), prevents non-destructive separation of the particular connection.

Exemplary embodiments of the present invention are directed to a battery having a number of electrically interconnected single cells, which is improved over the prior art, and a method for servicing, repairing, and/or optimizing such a battery.

A battery includes a number of single cells interconnected in series and/or in parallel, the electrical poles of which for the electrical interconnection are connected to one another in a positive-fit and/or integrally bonded manner, directly or by means of cell connectors, and a battery monitoring unit that is connected to the electrical poles and/or to the cell connectors in a positive-fit and/or integrally bonded manner. According to the invention, the electrical poles of the single cell, the cell connectors for electrically interconnecting adjoining single cells, and/or the battery monitoring unit in each case have redundant contact areas for the positive-fit and/or integrally bonded connection, in each case only one of the contact areas that are redundant with one another being connected in a positive-fit and/or integrally bonded manner.

As a result of the electrical poles, the cell connectors, and/or the battery monitoring unit having contact areas which are redundant with one another as components, it is possible in a particularly advantageous manner, despite destruction of the contact area via which the components are connected to one another in a positive-fit and/or integrally bonded manner, to once again connect the particular component in a positive-fit and/or integrally bonded manner. By means of the contact areas that are redundant with one another, it is possible, for example, to remove components of the battery for repair, service, and/or replacement, as the result of which the contact area of the positive-fit and/or integrally bonded connection is destroyed, and to mount the component or a replacement component and to connect it in a positive-fit and/or integrally bonded manner to a contact area that is redundant with the destroyed contact area.

In addition, by means of the redundant contact areas, provided that when a joint connection is established between components of the battery during initial assembly it is ascertainable that the joint connection is of poor quality, it is possible to make use of a further contact area for connecting the components in a positive-fit and/or integrally bonded manner without the need for replacing the component or components. It is thus possible to profitably reduce the costs and the time for manufacturing the battery.

The particular redundant contact areas particularly preferably have a separate and/or separable design, so that a contact area that has been made unusable due to destruction of the positive-fit and/or integrally bonded connection may be removed. To this end, the contact areas have a separate and/or separable design such that the removal may be carried out without major effort and/or a tool that is complicated to use.

In one possible embodiment, the particular electrical pole of the single cell has multiple redundant contact areas designed as tongue-like sections. A tongue-like section of the particular electrical pole of the single cell advantageously forms a weld point for integrally fastening the electrical pole to an electrical pole of an adjoining single cell or for integrally fastening to a cell connector.

To advantageously allow comparatively simple removal of a contact area, designed as a tongue-like section, which has been made unusable due to damage, the particular tongue-like sections particularly preferably have a predefined breaking point so that the unusable tongue-like section as the contact area may be removed prior to a new positive-fit and/or integrally bonded connection.

In one advantageous embodiment, the particular electrical pole of a single cell has a width such that at least two redundant contact areas are formed next to one another, a cell connector being fastenable in each contact area in a positive-fit and/or integrally bonded manner. Due to the design of the two redundant contact areas, the single cell is connectable two times to a further component in a positive-fit and/or integrally bonded manner. That is, during manufacture of the battery, the particular electrical pole of the single cell is connectable to a further component of the battery in a positive-fit and/or integrally bonded manner by means of a contact area, and if this contact area is unusable due to destruction of the connection, the further contact area may be used to connect the single cell, in particular to a cell connector, in a positive-fit and/or integrally bonded manner.

Furthermore, it is preferably provided that the particular cell connector, by means of which adjoining single cells are electrically connectable to one another, has a predefined breaking point. The predefined breaking point may advantageously be used to separate the cell connector for removing a single cell, at the pole of which the cell connector is welded, in order to be able to remove the single cell.

Alternatively or additionally, the cell connector is made of a material that has a predefined brittleness, so that the cell connector is severable when a predefined force acts on it, so that, for example, the single cell to which the cell connector is fastened in a positive-fit and/or integrally bonded manner is removable.

In another advantageous embodiment, a connecting element situated at the battery monitoring unit for connection to a cell connector and/or an electrical pole of the single cell has at least two adjacently situated redundant contact areas separated from one another by means of a predefined breaking point. It is thus advantageously possible to disconnect the battery monitoring unit from the electrical pole and/or the cell connector, and to use the further contact area for a new positive-fit and/or integrally bonded connection to an electrical pole of a single cell and/or to a cell connector.

The redundant contact areas are preferably formed on comparatively expensive components in order to connect these components multiple times to further components in a positive-fit and/or integrally bonded manner.

The invention further relates to a method for servicing, repairing, and/or optimizing a battery having as components a number of single cells interconnected in series and/or in parallel, the electrical poles of which for the electrical interconnection are connected to one another in a positive-fit and/or integrally bonded manner, directly or by means of cell connectors, and a battery monitoring unit which is connected to the electrical poles and/or to the cell connectors in a positive-fit and/or integrally bonded manner. According to the invention, for replacing a component, the positive-fit and/or integrally bonded connection of the contact area of the component that is not to be replaced, via which the component which is to be replaced and the component which is not to be replaced are electrically contacted with one another, is separated by destruction and a replacement component is connected in a positive-fit and/or integrally bonded manner to the contact area that is redundant with the destroyed contact area. In addition, a faulty positive-fit and/or integrally bonded connection of two contact areas may be replaced or supplemented by a positive-fit and/or integrally bonded connection of two contact areas which are redundant with same.

The replacement component is connected to the redundant contact area by welding, tox clinching, clinching, crimping, and/or riveting in an integrally bonded and/or positive-fit manner.

BRIEF DESCRIPTION OF THE DRAWING FIGURES

Figure 2:
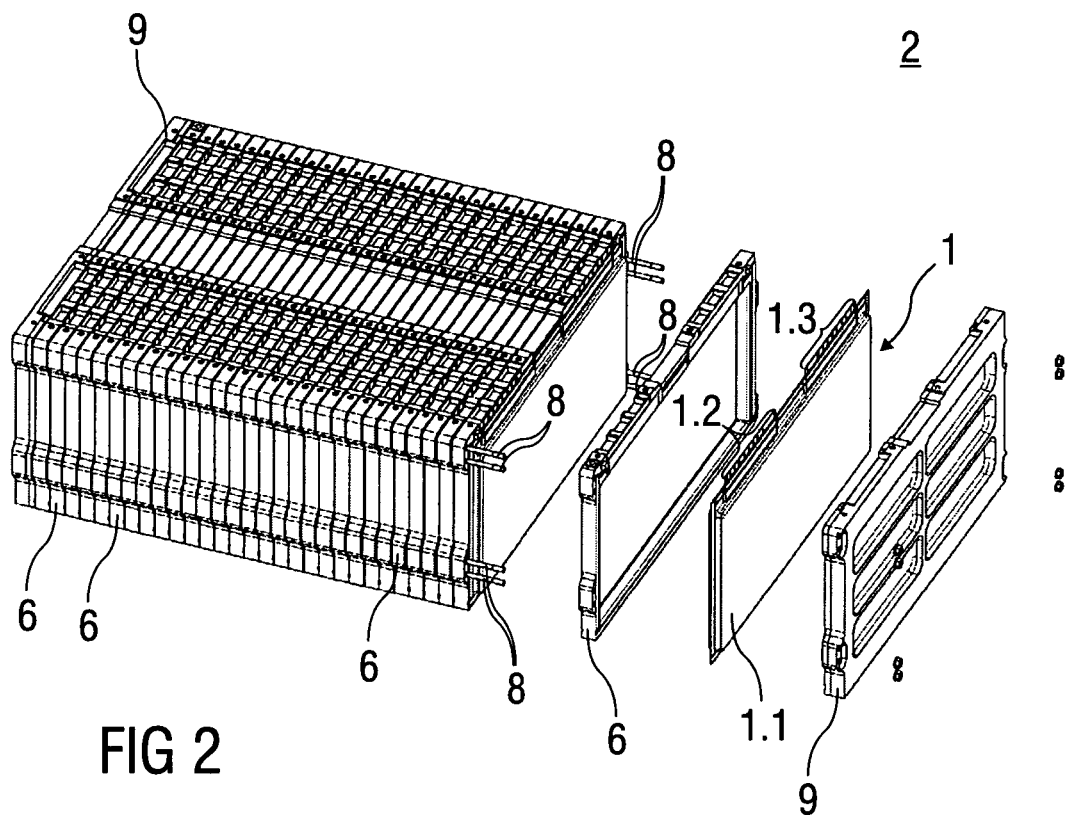
Figure 3:
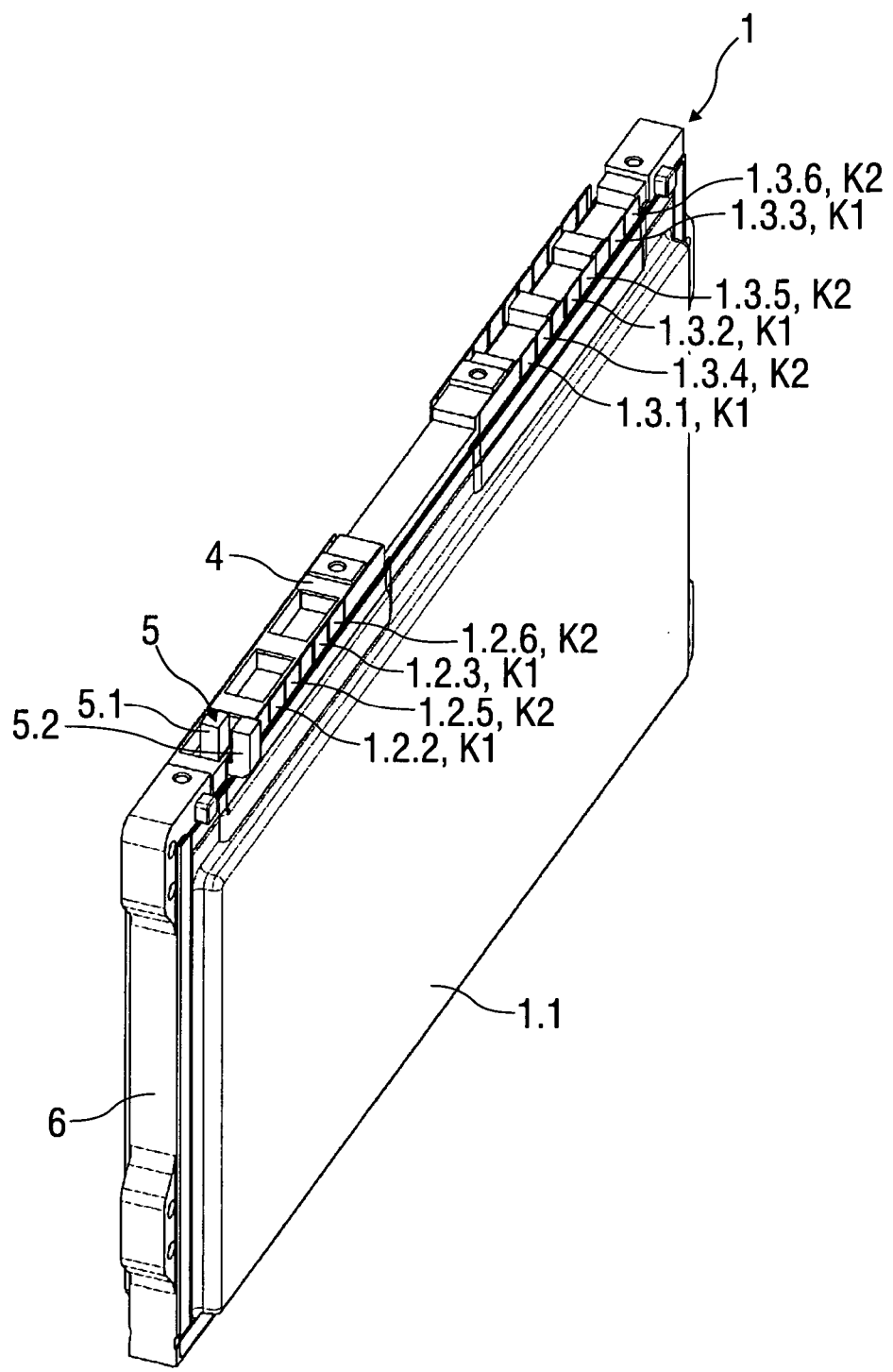
Figure 4:
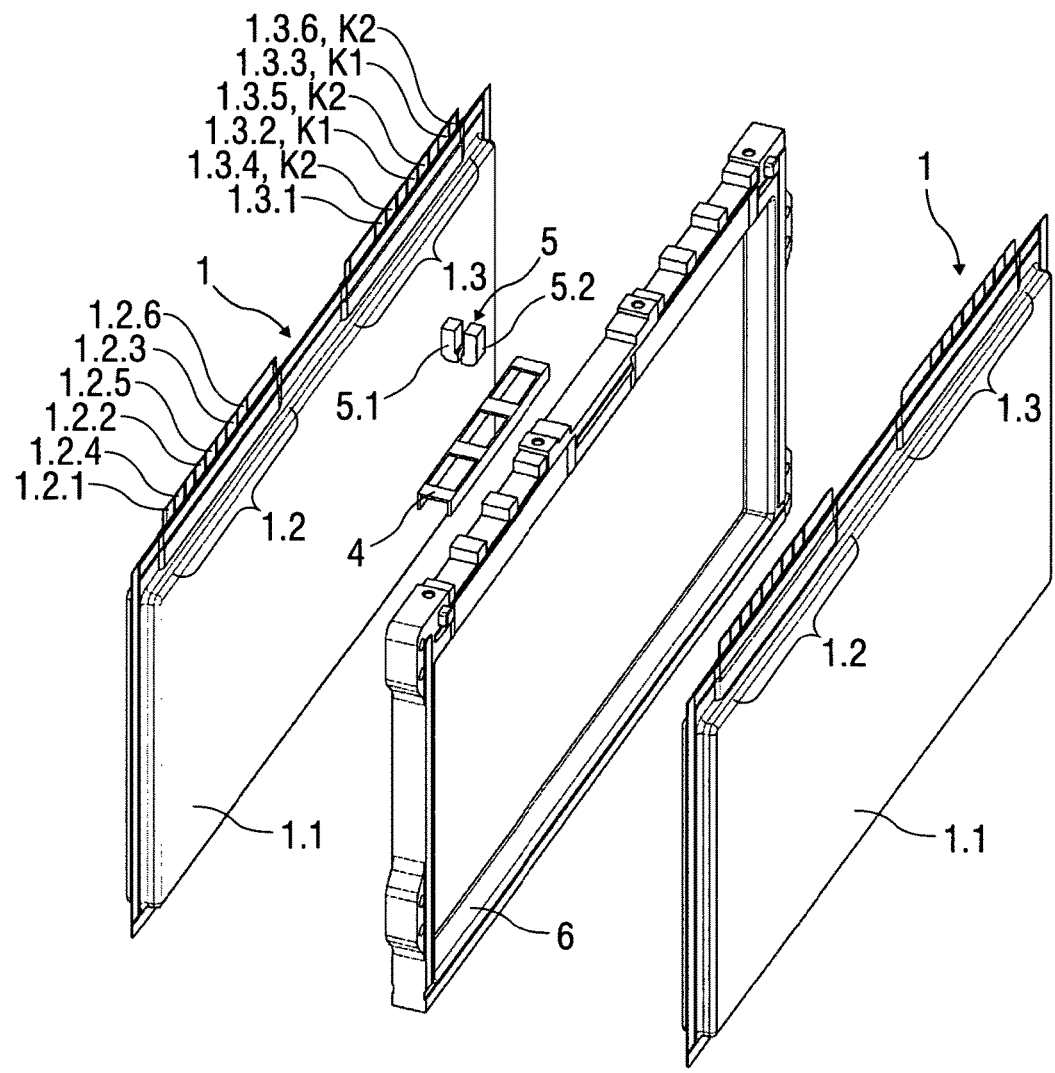
Figure 5:
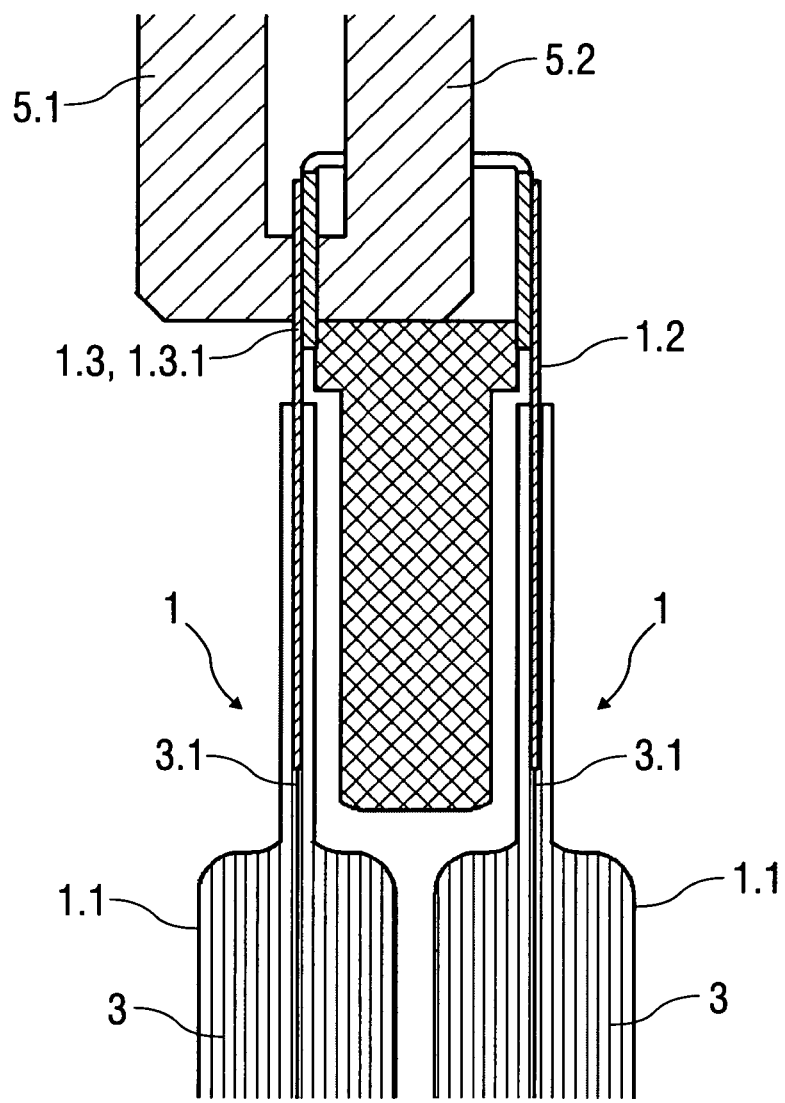
Figure 6:
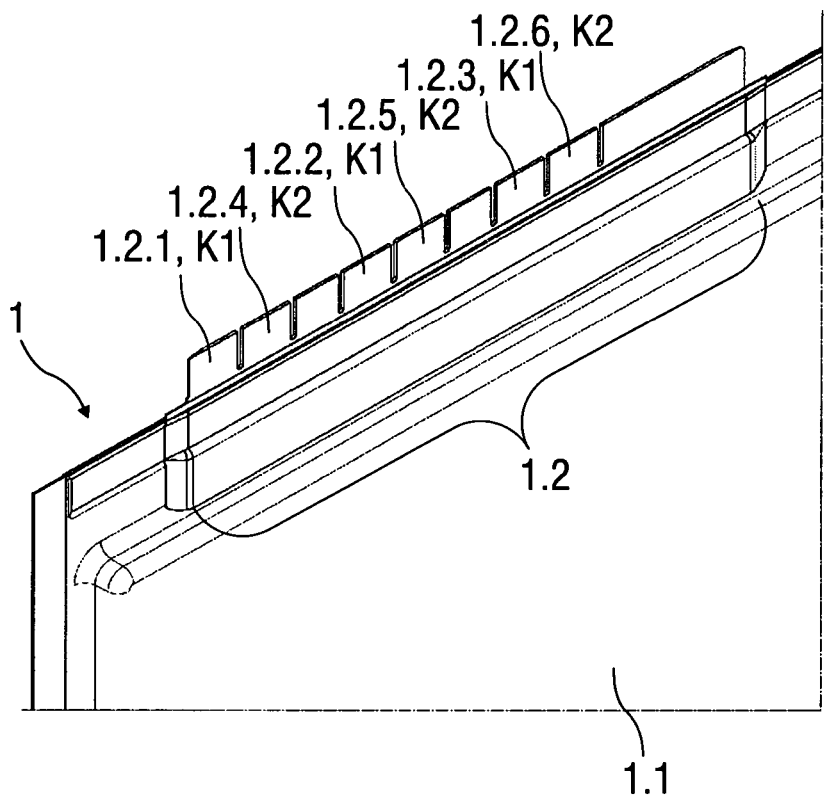
Figure 7:
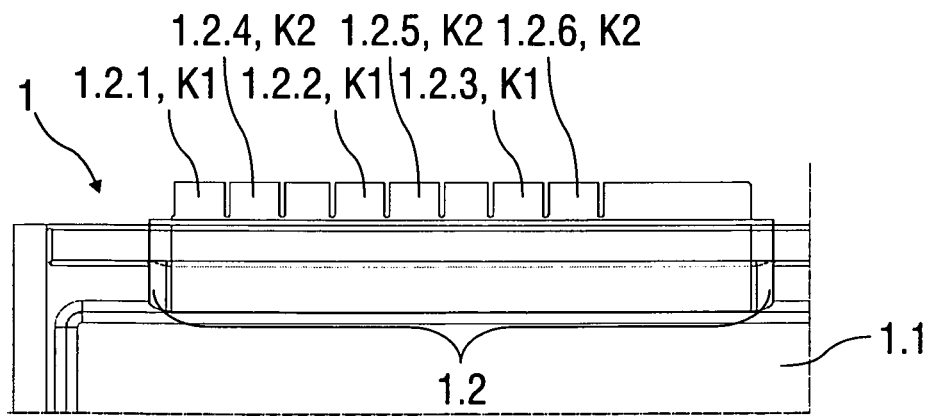
Figure 8:
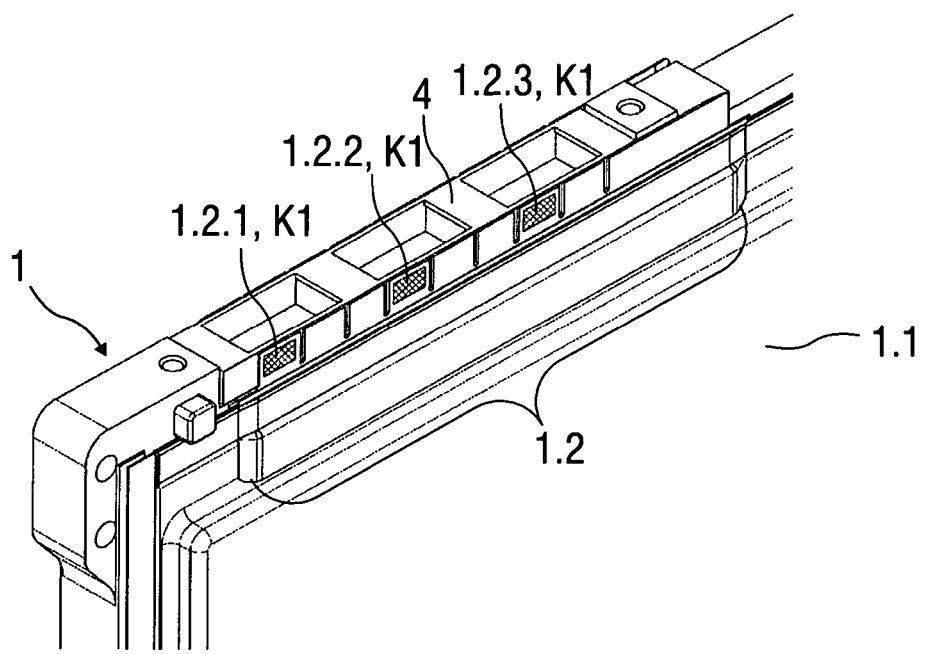
Figure 9:
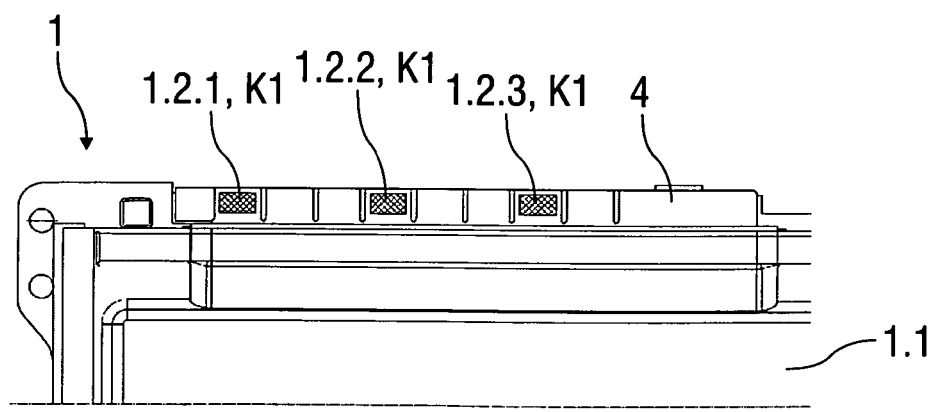
Figure 10:
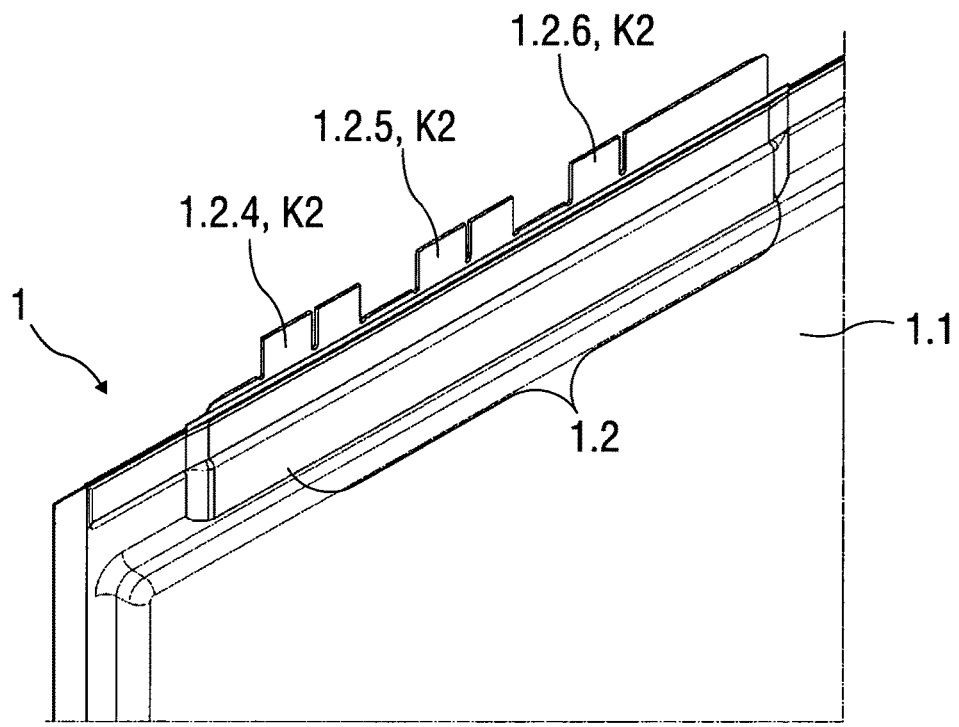
Figure 11:
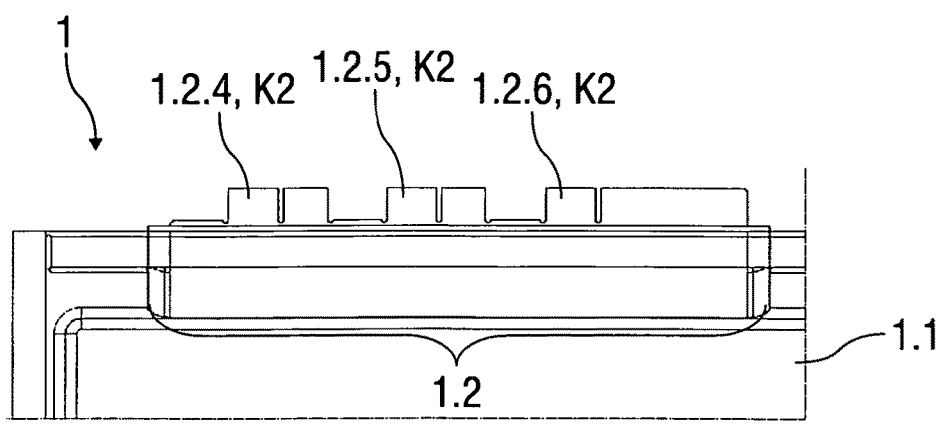
Figure 12:
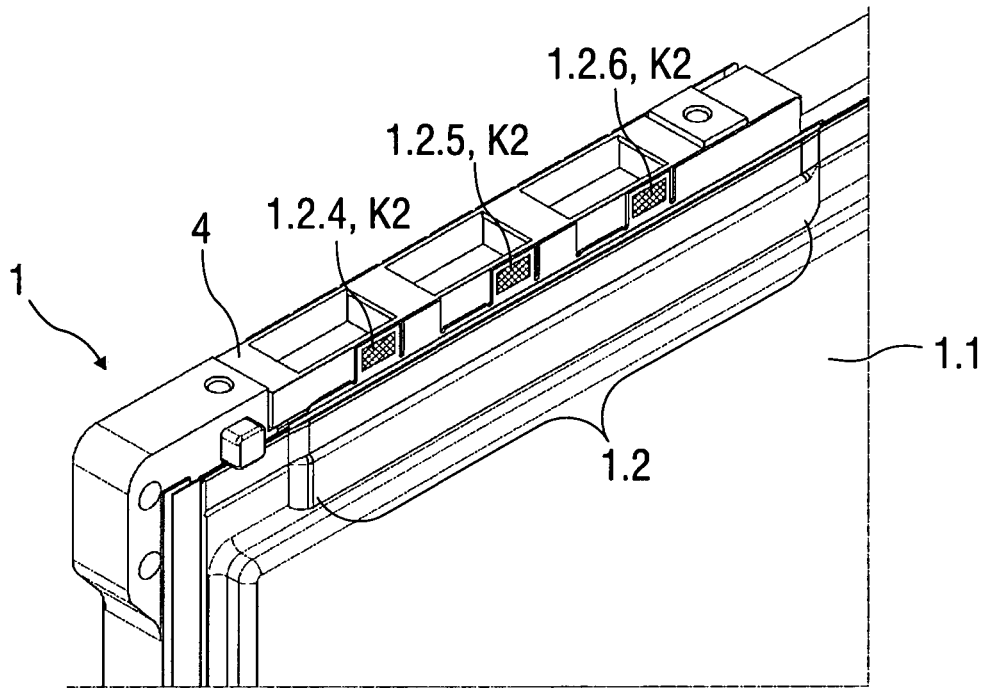
Figure 13:
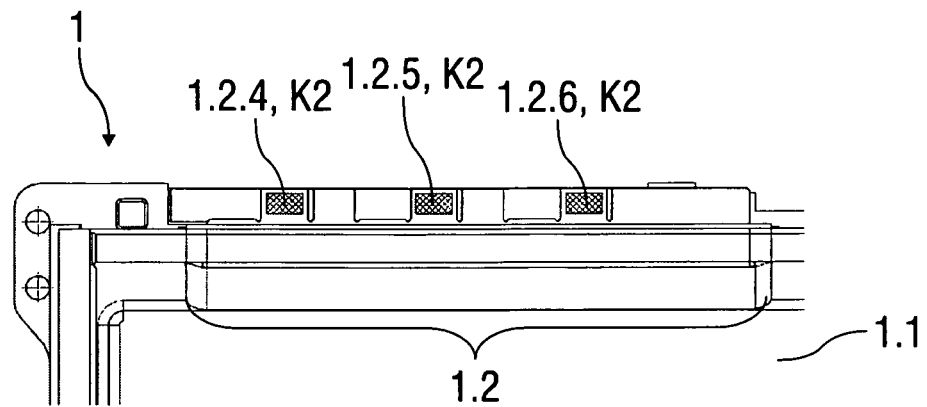
Figure 14:
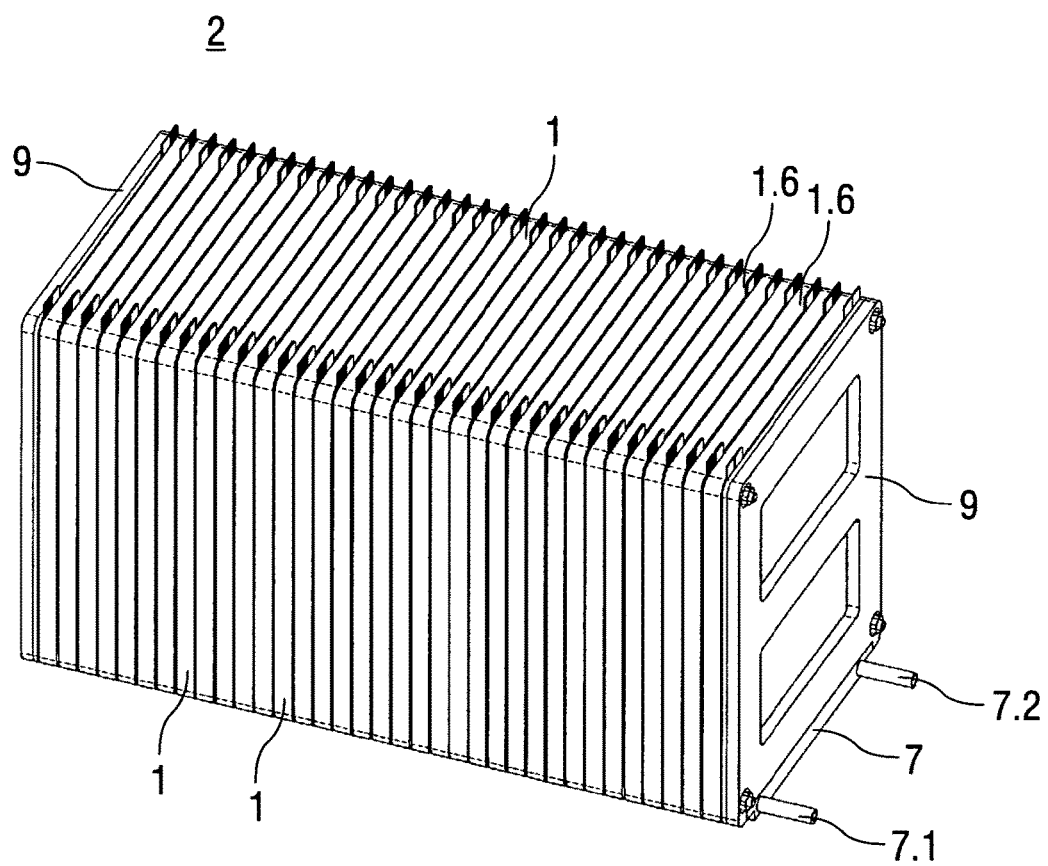
Figure 15:
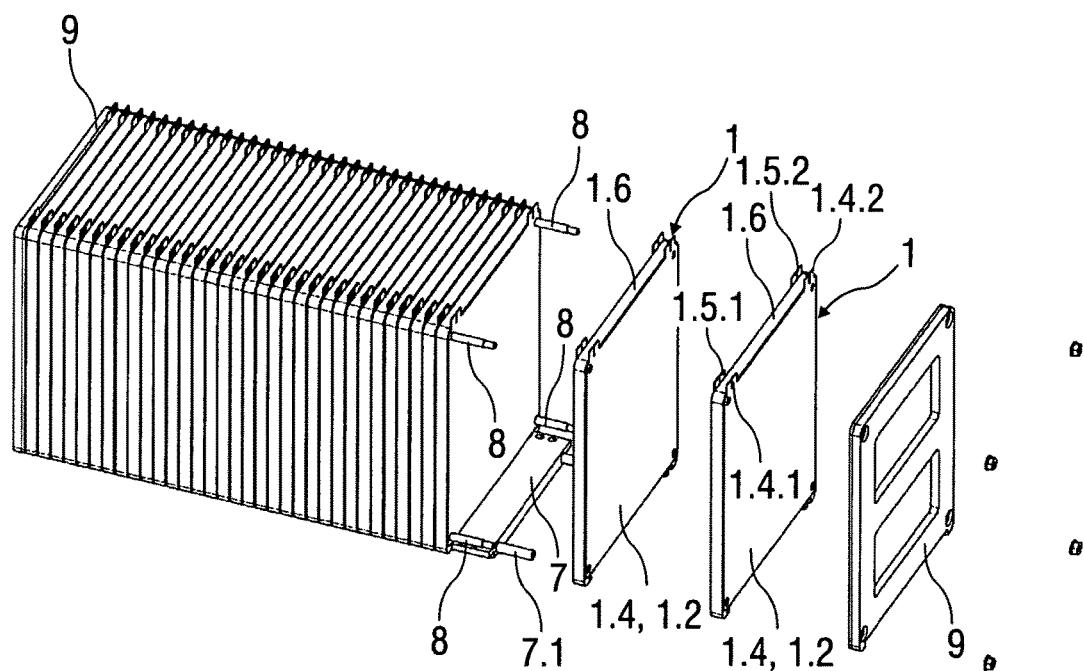
Figure 16:
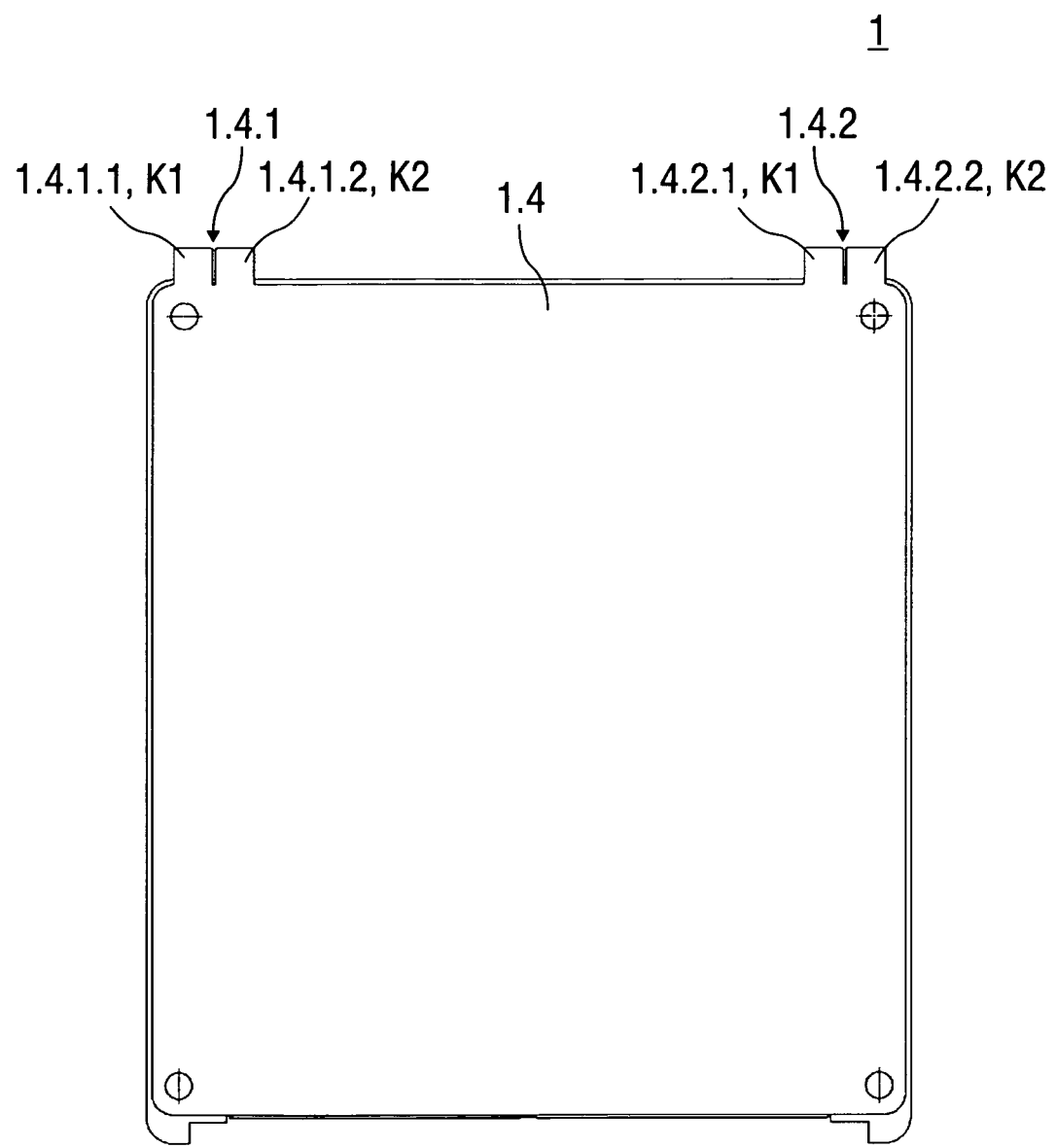
Figure 17:
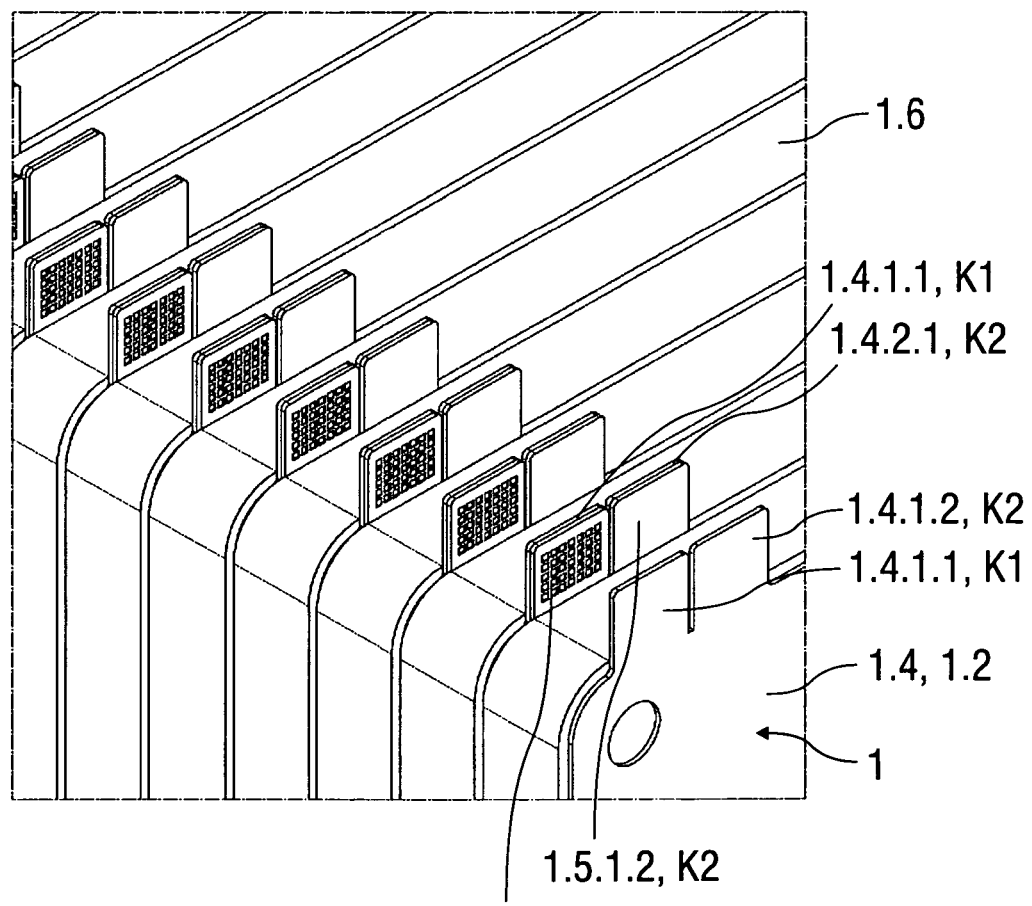
Figure 18:
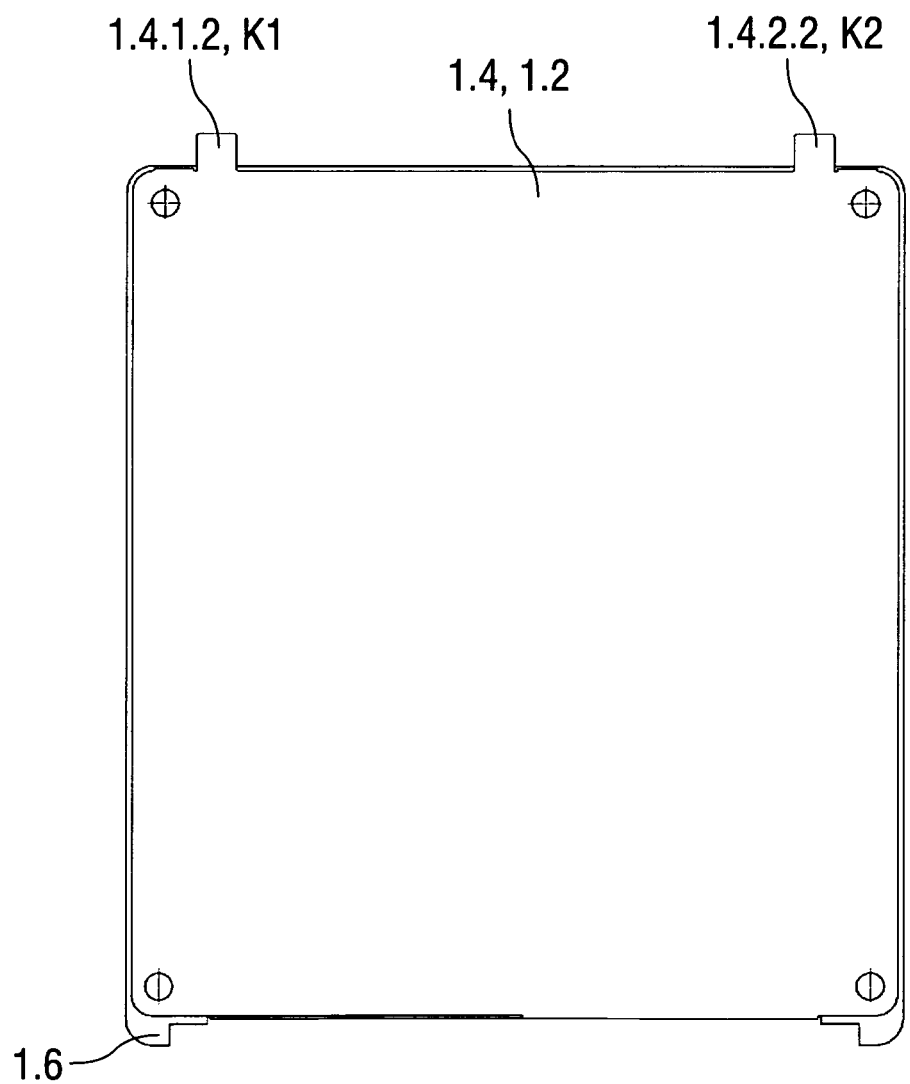
Figure 19:
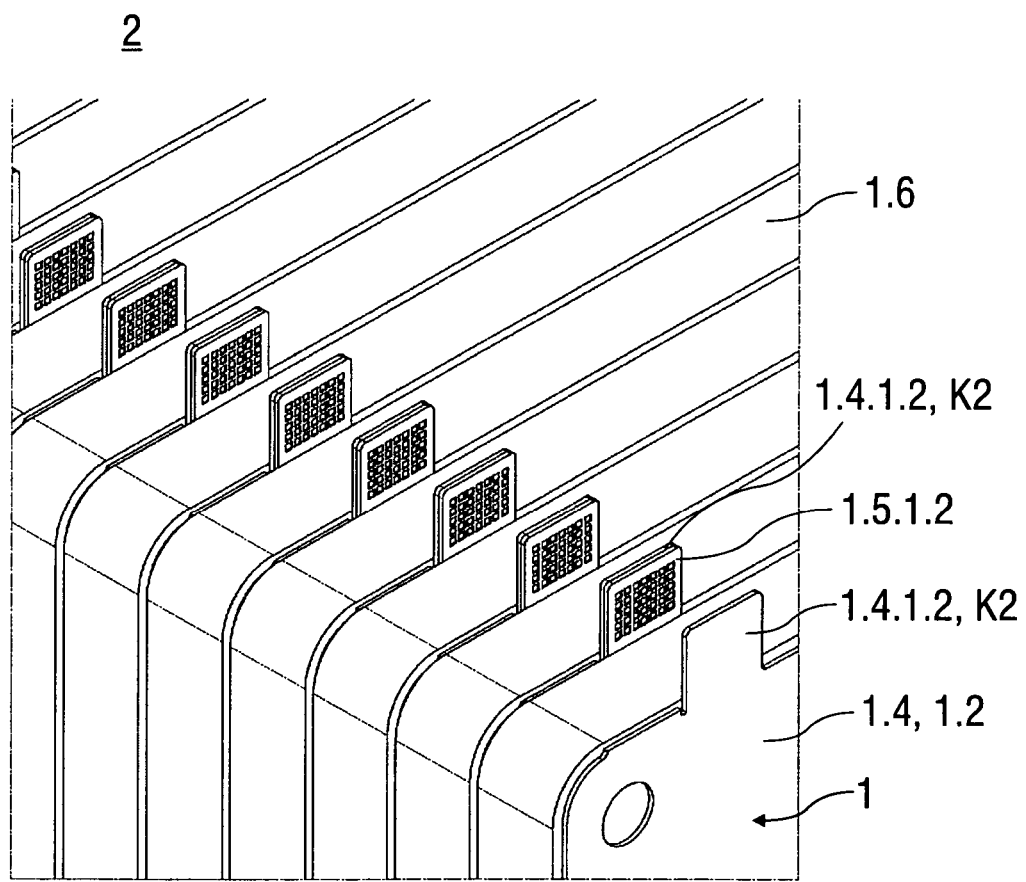
Figure 20:
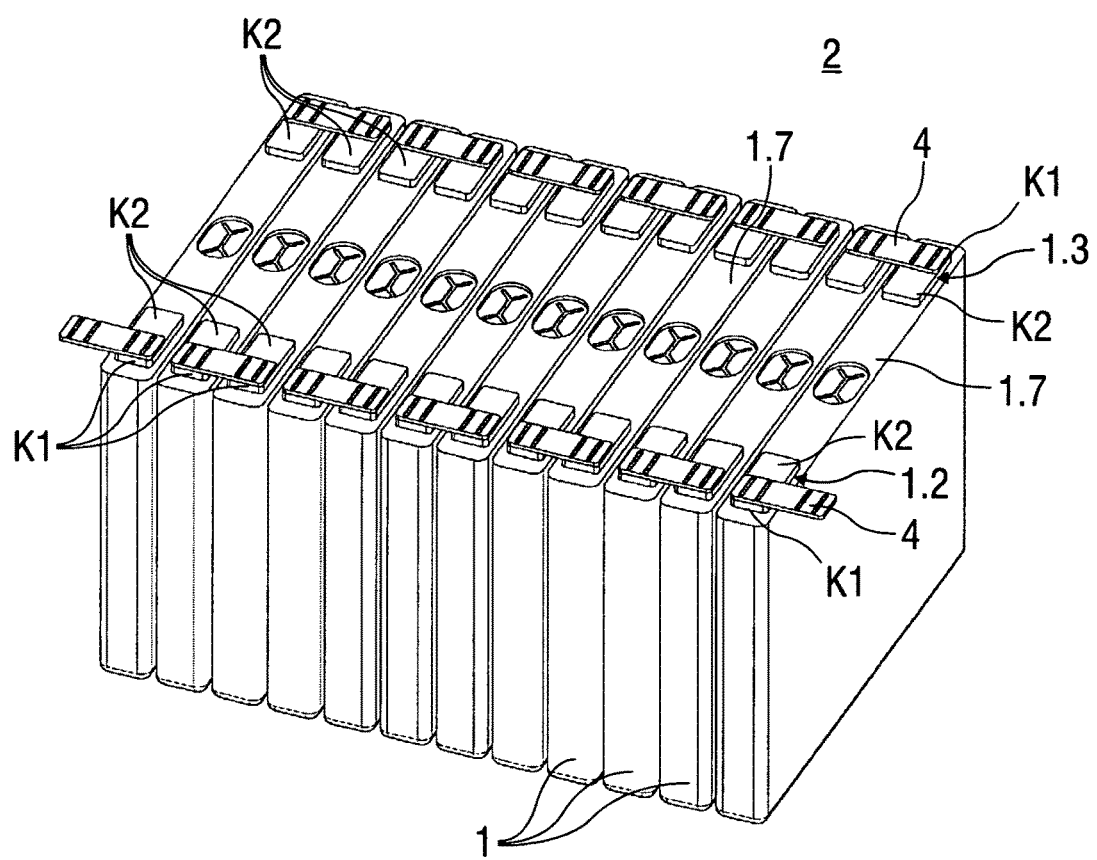
Figure 21:
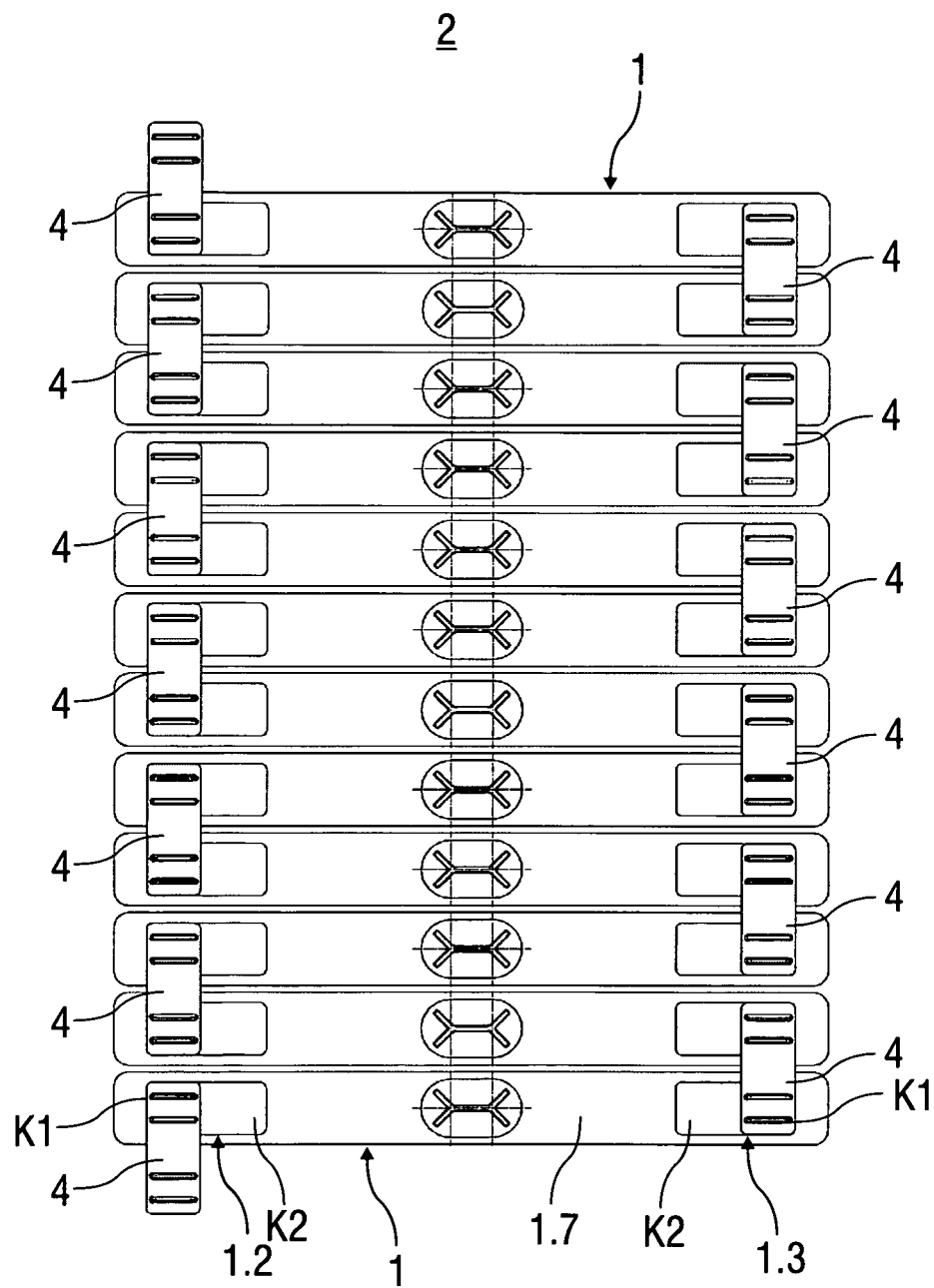
Figure 22:
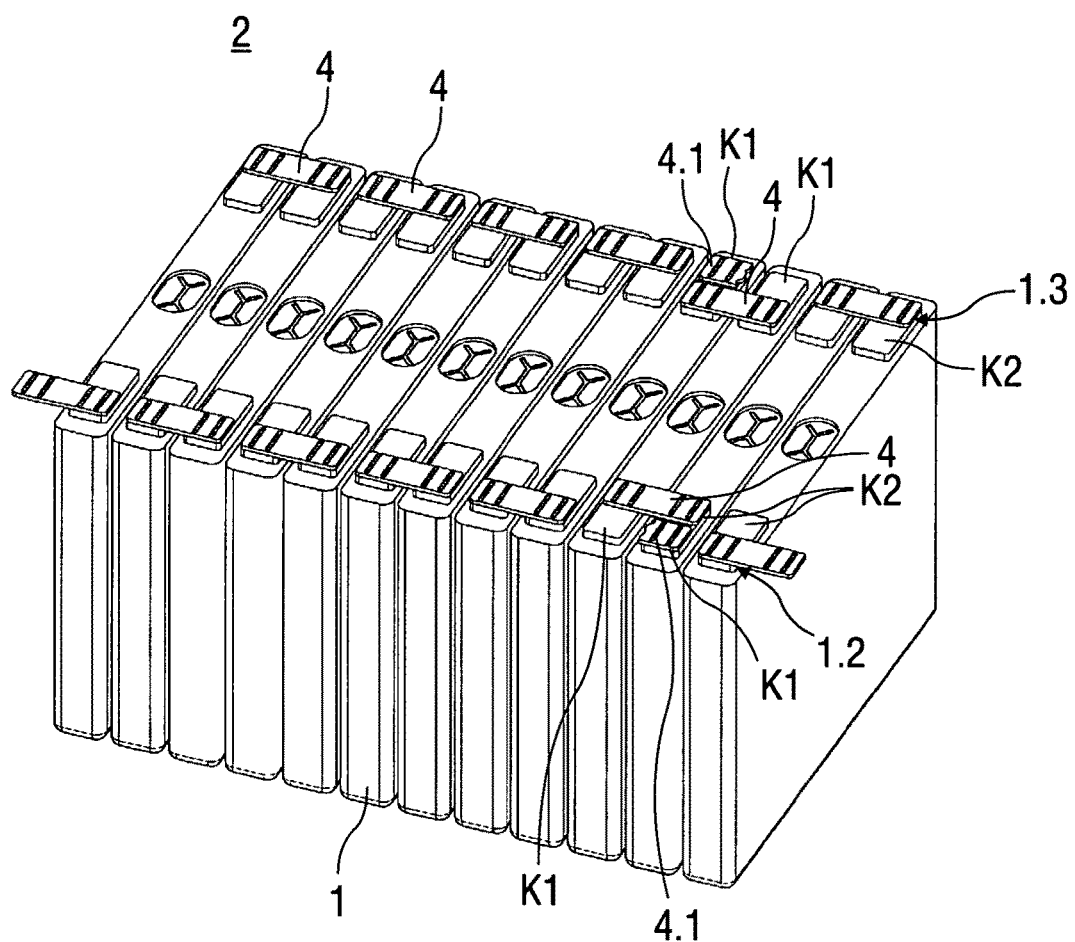
Figure 23:
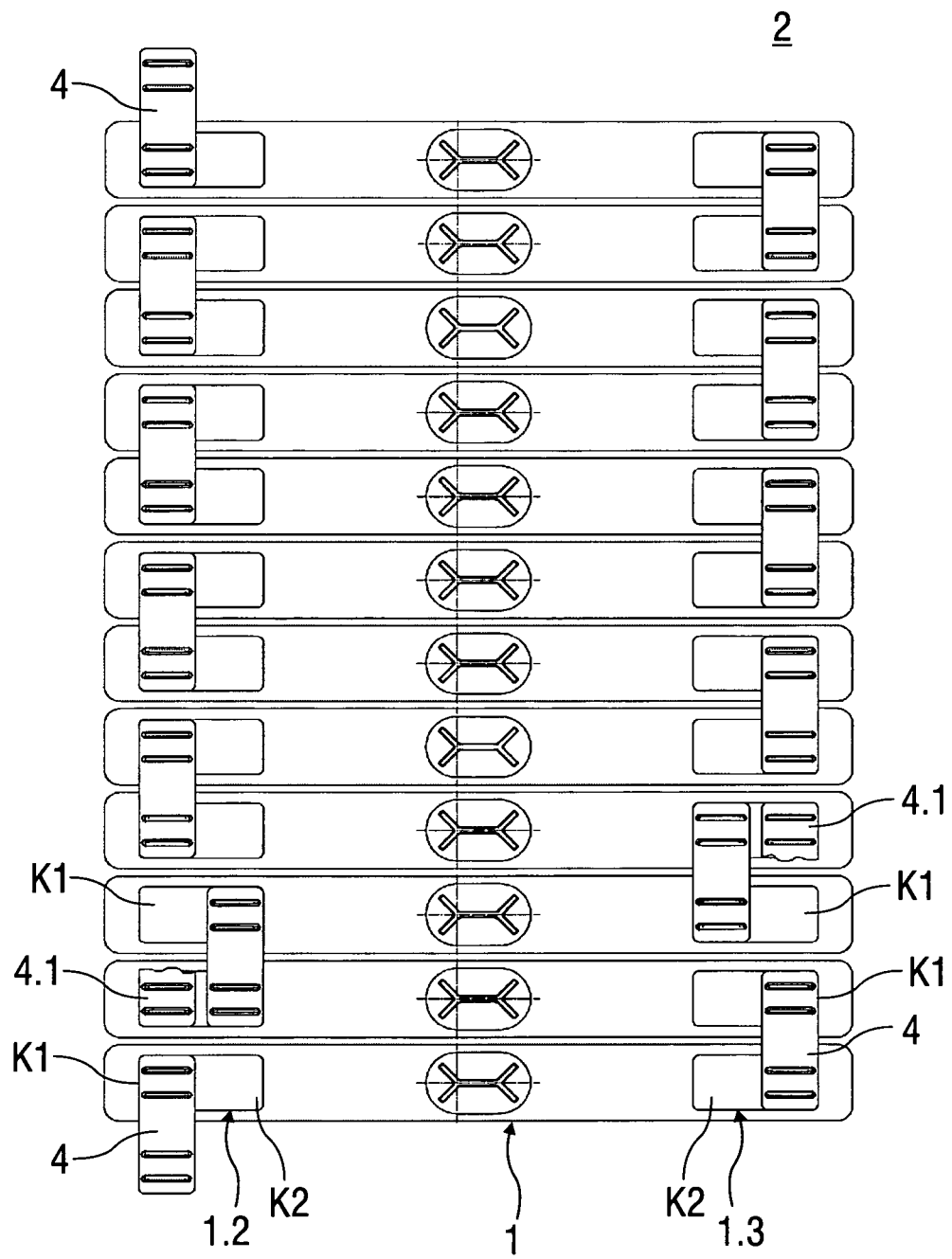
Figure 24:
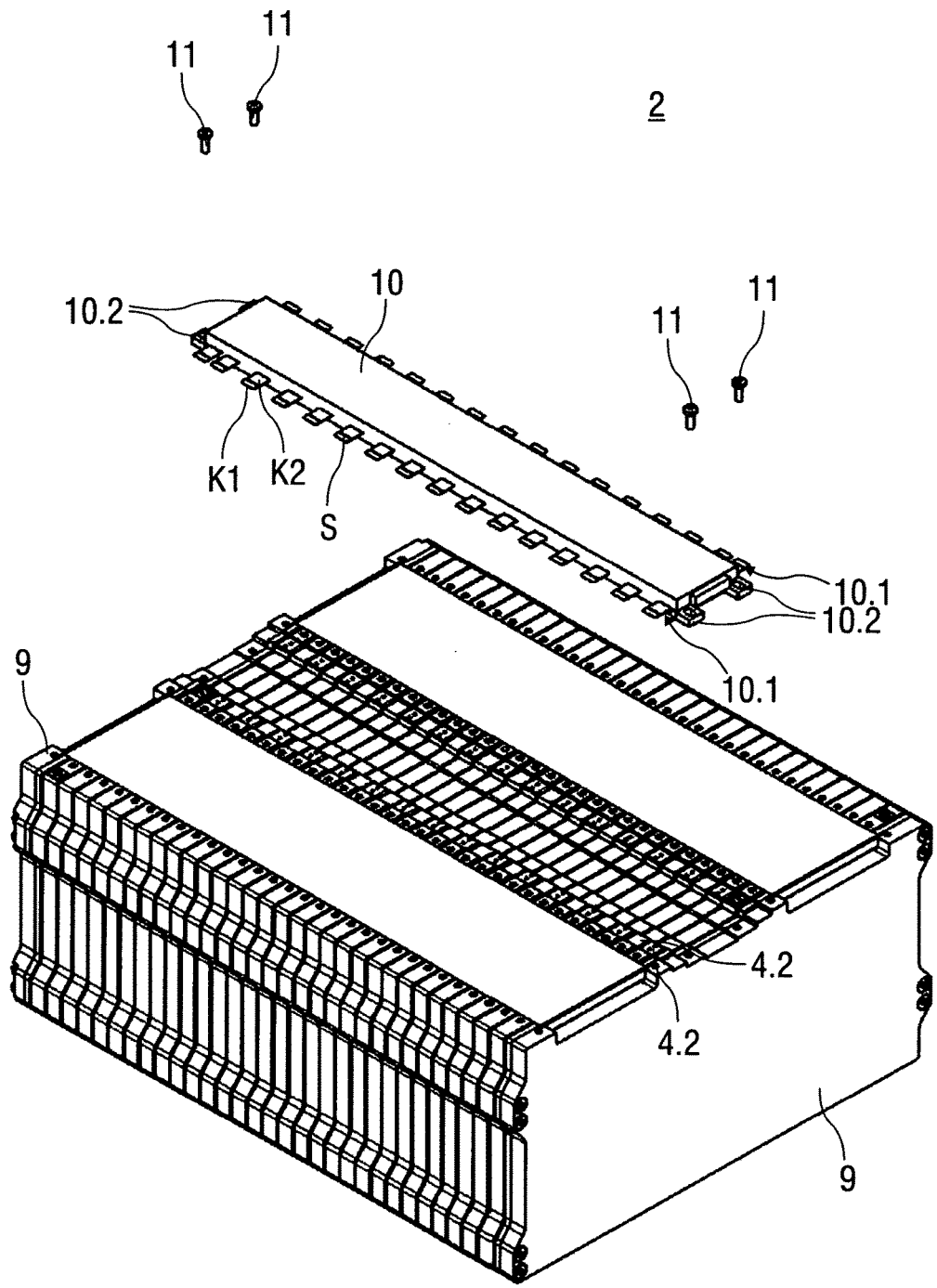
Figure 25:
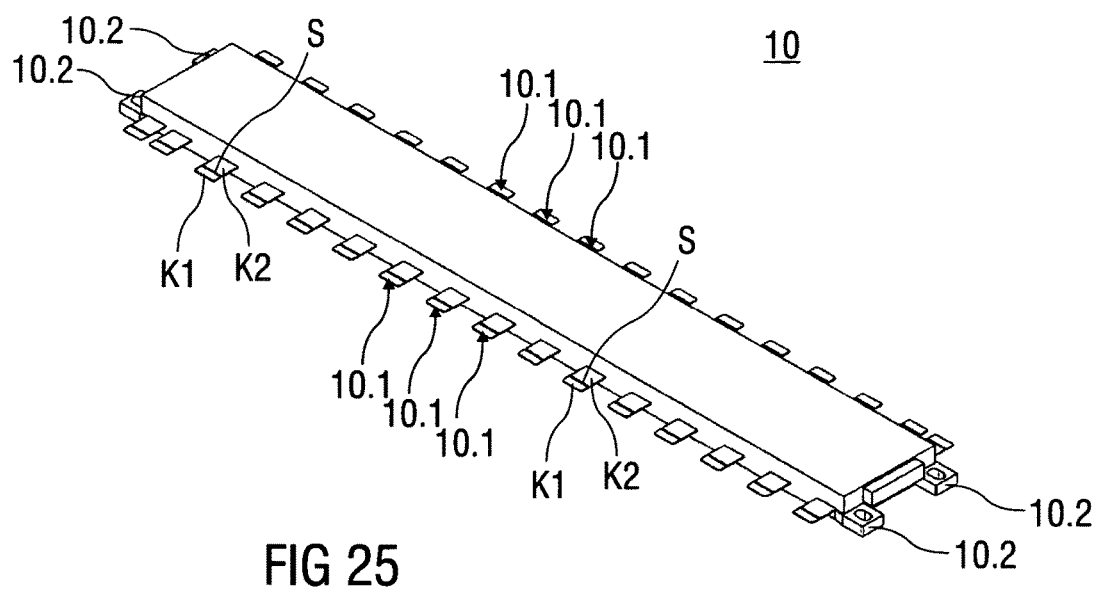
Figure 26:
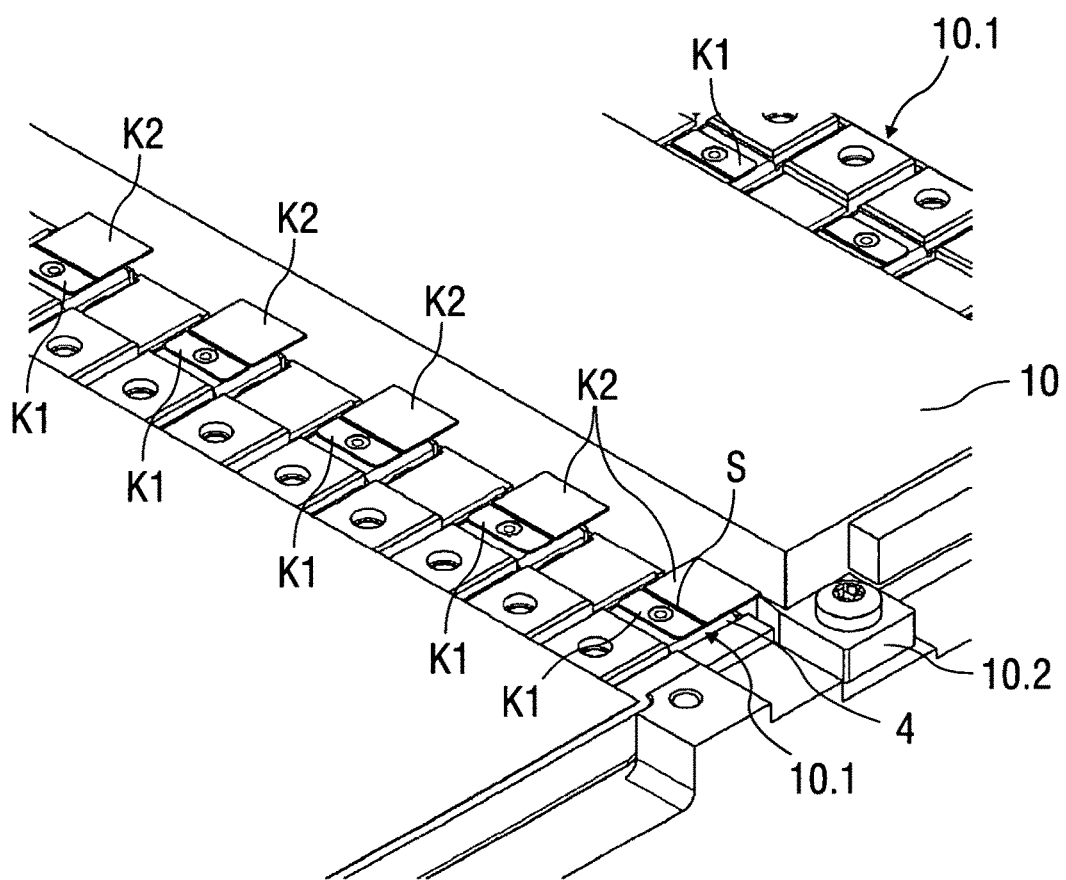
Figure 27:
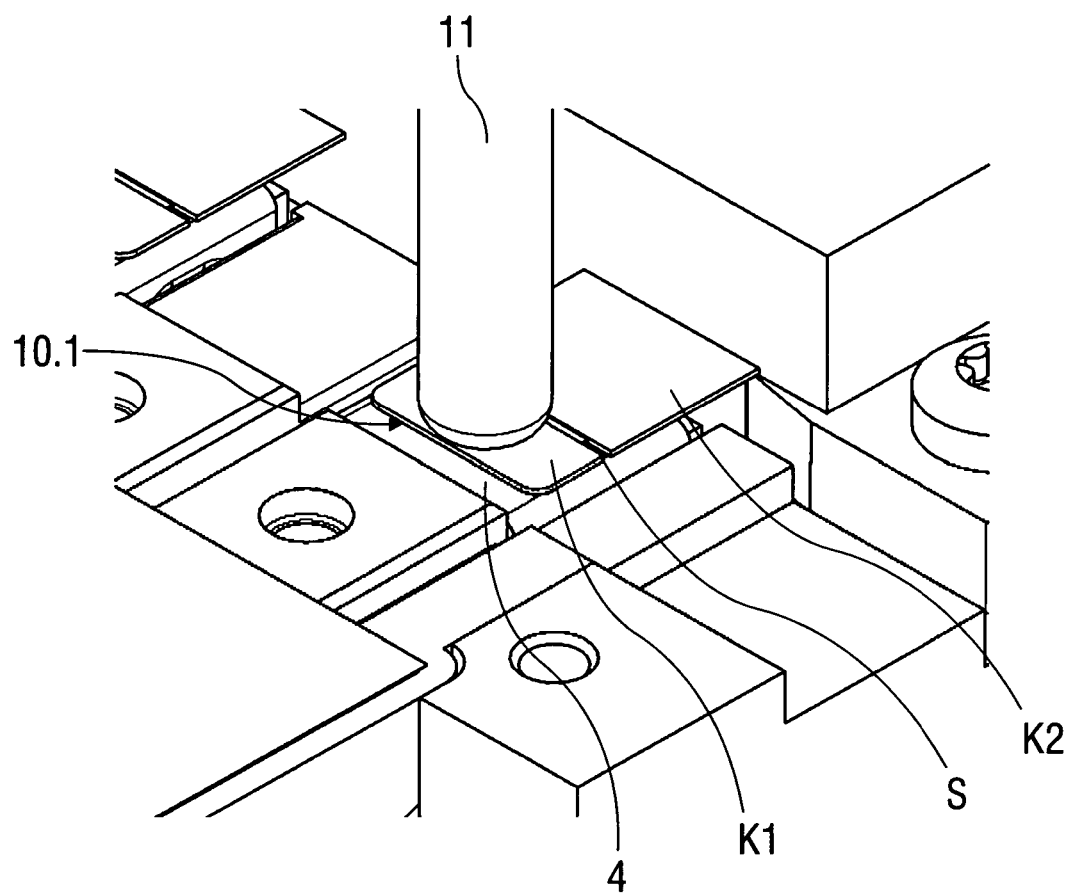
Figure 28:
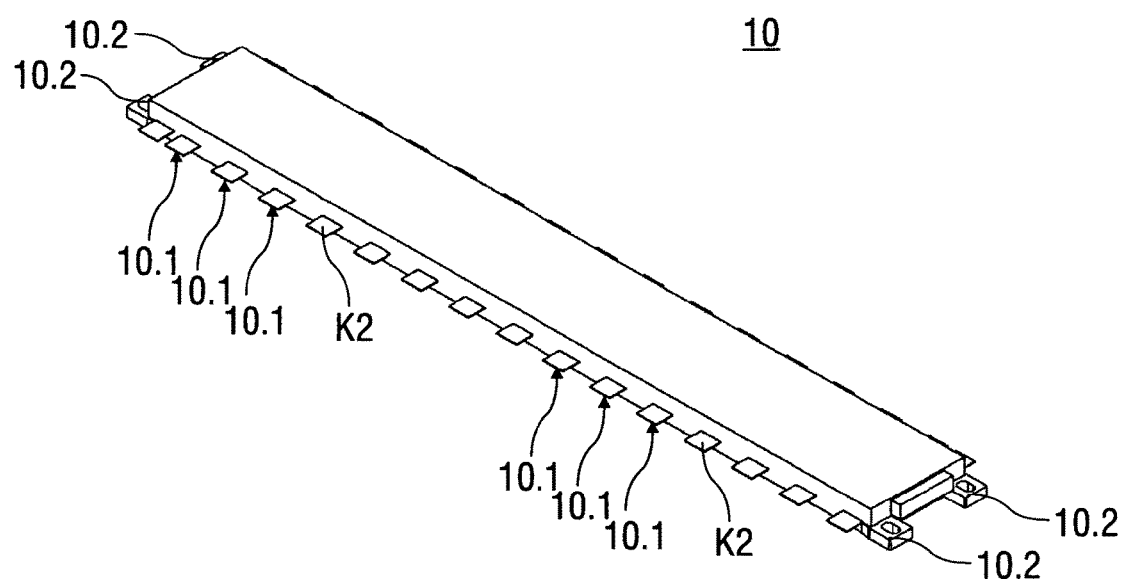
Figure 29:
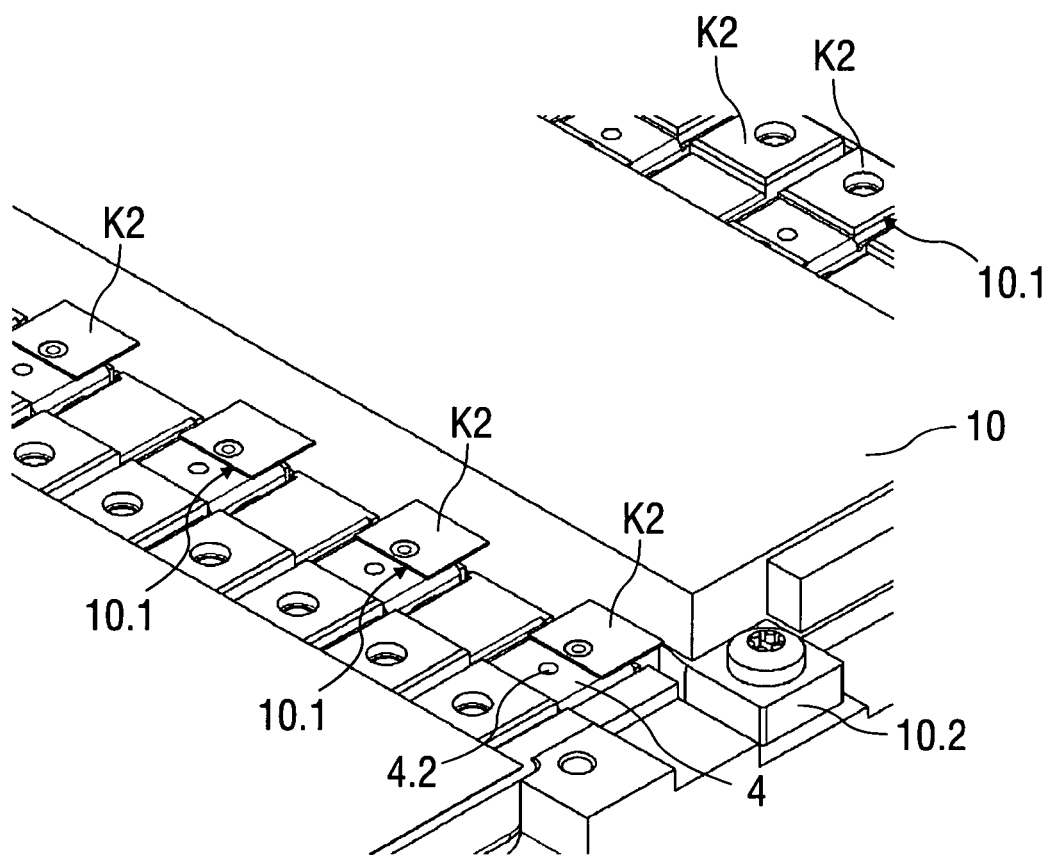
Figure 30:
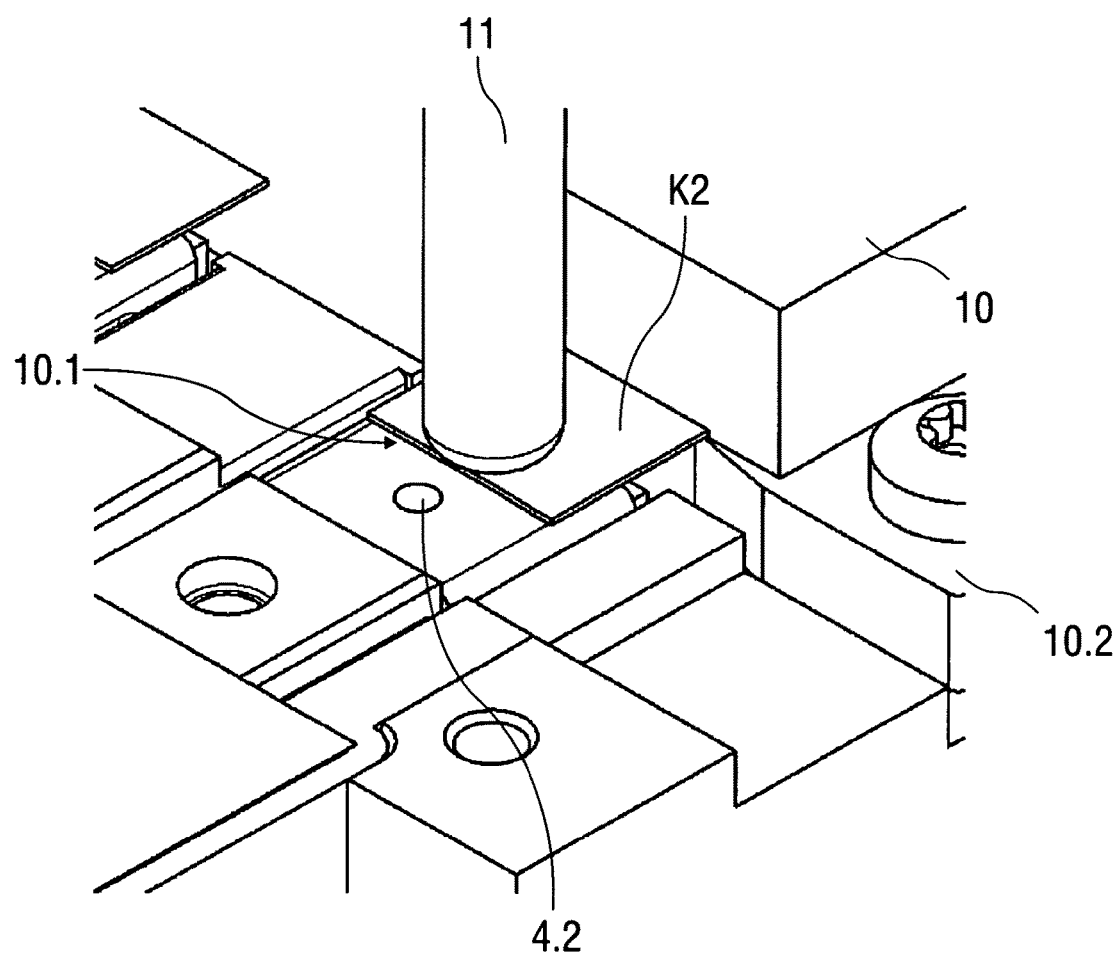

Exemplary embodiments of the invention are explained in greater detail below with reference to the drawings, which show the following:

FIG. 1 schematically shows a perspective view of a cell assembly of a battery having single cells designed as pouch cells, FIG. 2 schematically shows a perspective view of the cell assembly in a partially exploded illustration, FIG. 3 schematically shows two single cells which are electrically interconnected via cell connectors, and a holding frame, FIG. 4 schematically shows a perspective view of the single cells, a cell connector, the holding frame, and an ultrasonic welding tool in a perspective view, FIG. 5 schematically shows an enlarged detail of a sectional illustration of the two single cells during connection of their electrical poles by means of the welding tool, FIG. 6 schematically shows a perspective view of an enlarged detail of an electrical pole of a single cell having multiple contact areas which are redundant with one another, FIG. 7 schematically shows the enlarged detail in another view, FIG. 8 schematically shows a perspective view of an enlarged detail of an electrical pole of a single cell with a fastened cell connector, FIG. 9 schematically shows the enlarged detail according to FIG. 8 in another view, FIG. 10 schematically shows an enlarged detail of an electrical pole of a single cell with the contact area removed, in a perspective view, FIG. 11 schematically shows the enlarged detail according to FIG. 10 in another view, FIG. 12 schematically shows an enlarged detail of the single cell with a cell connector that is fastened to a further contact area, FIG. 13 schematically shows the enlarged detail according to FIG. 12 in another view, FIG. 14 schematically shows a perspective view of a cell assembly formed from bipolar flat-frame cells, the single cells having multiple contact areas, FIG. 15 schematically shows a perspective view of the cell assembly in a partially exploded illustration, FIG. 16 schematically shows a single cell which has multiple contact areas and is designed as a bipolar flat-frame cell, FIG. 17 schematically shows an enlarged detail of the cell assembly in a perspective view, FIG. 18 schematically shows the single cell after removal of a contact area, FIG. 19 schematically shows an enlarged detail of a cell assembly having single cells, after removal of a contact area, FIG. 20 schematically shows a perspective view of a cell assembly having single cells which have an electrical pole with multiple contact areas that are electrically interconnected to multiple contact areas by means of cell connectors, FIG. 21 schematically shows the cell assembly in a top view, FIG. 22 schematically shows the cell assembly after replacing a single cell, FIG. 23 schematically shows the cell assembly according to FIG. 20 in a top view, FIG. 24 schematically shows the cell assembly according to FIG. 1 together with a battery monitoring unit, in a perspective view, FIG. 25 schematically shows the battery monitoring unit in a perspective view, FIG. 26 schematically shows a perspective view of an enlarged detail of the cell assembly together with a fastened battery monitoring unit, FIG. 27 schematically shows a perspective view of a further enlarged detail of the battery monitoring unit fastened to the cell assembly, FIG. 28 schematically shows a perspective view of the cell monitoring unit together with connecting elements after removal of a contact area, FIG. 29 schematically shows a perspective view of an enlarged detail of the battery monitoring unit which is fastened to the cell assembly by means of a further contact area, and FIG. 30 schematically shows a perspective view of an enlarged detail of a connecting element of the battery monitoring unit during establishment of a connection.

Mutually corresponding parts are provided with the same reference numerals/characters in all figures.

DETAILED DESCRIPTION

FIGS. 1 and 2 illustrate a cell assembly 2 formed from a plurality of single cells 1 designed as pouch cells. At least one single cell 1, among others, is illustrated in greater detail in FIGS. 2, 3, and 4.

The cell assembly 2 is an integral part of a battery, which in particular is a vehicle battery for an electric vehicle, a hybrid vehicle, or a vehicle that is operated with fuel cells. The battery is a traction battery of such a vehicle.

The single cells 1 from which the cell assembly is formed are pouch cells; i.e., the single cells 1 have a plastic casing 1.1 in which an electrode foil system 3 in the form of an electrode foil stack or an electrode foil winding is situated. Each electrode foil system has coated anode foils and cathode foils as electrode foils, which are separated from one another by separator foils.

At an edge region of the electrode foil system 3, electrode foils of one polarity are led out in sections from the electrode foil system 3 and connected to one another as the pole contact 3.1. A respective pole contact 3.1 is led out from the plastic casing 1.1, together with a sheet metal part, to form an electrical pole 1.2, 1.3.

The single cells 1 of the cell assembly 2 are electrically interconnected in series, for this purpose the electrical poles 1.2, 1.3 of the single cell 1 in each case being connected to the electrical poles 1.2, 1.3 of an adjoining single cell 1 by means of a cell connector 4. The electrical poles 1.2, 1.3 of the particular single cell 1 are joined to the cell connector 4 by ultrasonic welding; an ultrasonic welding tool 5 for the integrally bonded connection is shown in greater detail in FIGS. 3, 4, and 5.

According to the invention, the particular electrical pole 1.2, 1.3 of the single cells has a plurality of contact areas K1, K2 that are redundant with one another. The contact areas K1, K2 are designed as separate tongue-like sections 1.2.1 through 1.2.6 and 1.3.1 through 1.3.6, respectively, and are situated at the respective electrical pole 1.2, 1.3. Three tongue-like sections 1.2.1 through 1.2.3 and 1.3.1 through 1.3.3 are associated with a first contact area K1, and three additional tongue-like sections 1.2.4 through 1.2.6 and 1.3.4 through 1.3.6 are associated with a second contact area K2, as illustrated in greater detail in FIGS. 3 and 4.

The cell connector 4 is situated or formed on a holding frame 6, a single cell 1 being situated on each side of the holding frame 6, and the electrical poles 1.2, 1.3 of the adjoining single cells 1 being electrically interconnected by means of a cell connector 4. The holding frame 6 is preferably made of a plastic.

If the temperature of the cell assembly 2 is regulated by a thermally conductive plate 7, illustrated in FIG. 14, the cell connectors 4 form a connecting point between the single cells 1 and the thermally conductive plate 7. As a result of the cell connectors 4 being integrally bonded to the electrical poles 1.2, 1.3 of the particular single cell 1, the cell connectors 4 are thermally coupled to a cell interior, so that the cell connectors 4 are additionally used as a thermally conductive element. A thermally conductive foil, not illustrated in greater detail, for electrically insulating the thermally conductive plate 7 from the cell connectors 4 is situated between the cell connectors 4 and the thermally conductive plate 7.

For axially pressing the cell assembly 2, tension rods 8 are provided which are led through pressure plates 9 situated on the end-face side of the cell assembly 2, and through openings in corner areas of the particular holding frame 6.

FIG. 3 illustrates a perspective view of two single cells 1 situated on each side of a holding frame 6. In addition, FIG. 3 shows the ultrasonic welding tool 5 by means of which the electrical poles 1.2, 1.3 are connectable to the cell connectors 4 via a contact area K1, K2.

The ultrasonic welding tool 5 has a movable sonotrode 5.1 and a stationary anvil 5.2; the step of the integrally bonded connection using the ultrasonic welding tool 5 is illustrated in greater detail in FIG. 5.

During production of the single cell 1, the electrical poles 1.2, 1.3 are formed in such a way that they are divided into the two contact areas K1, K2 in the form of the respective tongue-like sections 1.2.1 through 1.2.3 and 1.3.1 through 1.3.3, and 1.2.4 through 1.2.6 and 1.3.4 through 1.3.6.

If the particular single cell 1 is an integral part of a cell assembly 2, the particular electrical pole 1.2, 1.3 of the single cell 1 is connected in an integrally bonded manner to the cell connector 4 in each case via three tongue-like sections 1.2.1 through 1.2.3 and 1.3.1 and 1.3.3 as the first contact area K1, as illustrated in greater detail in FIG. 8. The tongue-like sections 1.2.1 through 1.2.6 and 1.3.1 through 1.3.6, as contact areas K1, K2, respectively, preferably form a weld point for the integrally bonded connection.

FIG. 4 shows the holding frame 6, the two single cells 1, a cell connector 4 situated at a first electrical pole 1.2, and the ultrasonic welding tool 5 in an exploded illustration, and FIG. 5 shows a sectional illustration of an upper area of two single cells 1 during establishment of the integrally bonded connection between a contact area K1, K2 and the cell connector 4. The cell connector 4 is placed on the holding frame 6 and connected to the first electrical pole 1.2 via the tongue-like sections 1.2.1 through 1.2.3 as the first contact area K1.

As described above, the ultrasonic welding tool 5 is composed of a high-frequency movable sonotrode 5.1 and a stationary anvil 5.2; for the integrally bonded connection the tongue-like sections 1.2.1 through 1.2.3 of the first contact area K1 of the first electrical pole 1.2, the tongue-like sections 1.3.1 through 1.3.3 of a second electrical pole 1.3 of the single cell 1, and the cell connector 4 are situated above the holding frame 6, between the sonotrode 5.1 and the anvil 5.2. For this purpose, the sonotrode 5.1 is insertable into a pocket of the cell connector 4, and connects same in an integrally bonded manner to a first tongue-like section 1.3.1 of the second electrical pole 1.2, thus producing a weld joint.

FIGS. 6 and 7 each show a view of the first electrical pole 1.2 of a single cell 1 designed as a pouch cell.

The first electrical pole 1.2 is divided into the two contact areas K1, K2, six tongue-like sections being provided as contact areas.

A first, a fourth, and a seventh tongue-like section 1.2.1 through 1.2.3 form the first contact area K1, and a second, a fifth, and an eighth tongue-like section 1.2.4 through 1.2.6 form the second contact area K2, of the first electrical pole 1.2 of the single cell 1.

The sections of the first electrical pole 1.2 formed between the tongue-like sections 1.2.1 through 1.2.6 of the contact areas K1, K2 rest against formed webs of the cell connector 4, and do not form a further contact area, as shown in greater detail in FIGS. 8 and 9.

FIGS. 8 and 9 each show a view of an enlarged detail of the first electrical pole 1.2, which is connected in an integrally bonded manner to the cell connector 4 via its first contact area K1.

When the cell assembly 2 is disassembled, the integrally bonded connection in the first contact area K1 may be separated only by destruction, as the result of which the tongue-like sections 1.2.1 through 1.2.3 and 1.3.1 through 1.3.3 of the first contact area K1 are unusable for a new joining process, for example due to deformation, cracks, and/or outbreaks.

The tongue-like sections 1.2.1 through 1.2.3 and 1.3.1 through 1.3.3 of the first contact area K1 preferably have predefined breaking points, not illustrated in greater detail, so that the first contact area K1 is removable from the first electrical pole 1.2 of the single cell 1.

FIGS. 10 and 11 illustrate the first electrical pole 1.2 of the single cell 1 with the first contact area K1 removed.

The first contact area K1, which comprises the first, the fourth, and the seventh tongue-like section 1.2.1 through 1.2.3, is removed by breaking the predefined breaking points from the first electrical pole 1.2 of the single cell 1.

To electrically reconnect the single cell 1 to an adjoining single cell 1 by means of a cell connector 4, the second contact area K2 of the electrical poles 1.2, 1.3 is connected in an integrally bonded manner to the cell connector 4, as illustrated in detail in FIGS. 12 and 13.

FIGS. 14 and 15 each show a cell assembly 2 formed with single cells 1 designed as bipolar flat cells. FIG. 14 shows the cell assembly 2 in a perspective view, and FIG. 15 likewise shows the cell assembly 2 in a perspective view in a partial exploded illustration.

A thermally conductive plate 7, by means of which lost heat which results during charging and discharging of the single cells 1 may be dissipated, is situated at the base side of the cell assembly 2. The thermally conductive plate 7 has a channel structure, not illustrated in greater detail, through which a coolant or refrigerant may flow, so that the lost heat that is delivered to the thermally conductive plate 7 may be efficiently dissipated. For this purpose, the channel structure has an inlet opening 7.1 and an outlet opening 7.2.

The cell assembly 2, which is formed as a single cell 1 by means of the bipolar flat-frame cells, the same as the cell assembly 2 according to FIGS. 1 and 2, is axially braced by means of pressure plates 9 and tension rods 8 situated on the end-face side.

The single cell 1 in the form of the bipolar flat-frame cell, illustrated in FIG. 16, has a metallic housing that is formed from two enveloping metal sheets 1.4, 1.5 and an electrically insulating frame 1.6 situated in between. To this end, the frame 1.6 is made of a plastic.

In the present exemplary embodiment, the enveloping metal sheets 1.4, 1.5 have a planar design; at least one of the enveloping metal sheets 1.4, 1.5 may also be designed as a dish-shaped enveloping metal sheet.

An electrode foil system 3 in the form of an electrode foil winding or an electrode foil stack is likewise situated in the housing, in each case one pole contact 3.1 of the electrode foil system 3 being connected to an enveloping metal sheet 1.4, 1.5, so that the enveloping metal sheets 1.4, 1.5 conduct voltage, i.e., in each case form an electrical pole 1.2, 1.3 of the single cell 1. In addition, the enveloping metal sheets 1.4, 1.5 of the particular single cell 1 are used as a heat-conducting plate.

Two flag-like extensions 1.4.1, 1.4.2 are formed on a top side of a first enveloping metal sheet 1.4, and two flag-like extensions 1.5.1, 1.5.2 are formed on a second enveloping metal sheet 1.5, in each case one flag-like extension 1.4.1, 1.4.2, 1.5.1, 1.5.2 for the electrical interconnection in series of the single cell 1 being connected in an integrally bonded manner to a flag-like extension 1.4.1, 1.4.2, 1.5.1, 1.5.2, respectively, of an adjoining single cell 1 by means of ultrasonic welding, for example.

According to the invention, the particular flag-like extension 1.4.1, 1.4.2, 1.5.1, 1.5.2 is divided into two tongue-like sections 1.4.1.1 and 1.4.1.2, 1.4.2.1 and 1.4.2.2, 1.5.1.1 and 1.5.1.2, and 1.5.2.1 and 1.5.2.2, respectively, as weld tabs for the integrally bonded connection, so that two contact areas K1, K2 for the electrical interconnection are formed with respect to the flag-like extensions 1.4.1, 1.4.2, respectively.

In addition, these respective two tongue-like sections 1.4.1.1 and 1.4.1.2, 1.4.2.1 and 1.4.2.2, 1.5.1.1 and 1.5.1.2, and 1.5.2.1 and 1.5.2.2 have predefined breaking points, not illustrated in greater detail.

FIG. 17 illustrates a perspective view of an enlarged detail of single cells 1, electrically interconnected in series, in the form of bipolar flat-frame cells.

To form the cell assembly 2, the flag-like extensions 1.4.1.1, 1.4.2.1 and 1.5.1.1, 1.5.2.1 of the enveloping metal sheets 1.4, 1.5, respectively, associated with the first contact area K1, as an electrical pole 1.2, 1.3 of a single cell 1, are connected in an integrally bonded manner to a first contact area K1 of the adjoining single cell 1.

If the cell assembly 2 is disassembled for service and/or repair, for example, the integrally bonded connection between the first contact areas K1 of the adjoining single cells 1 is separated due to the fact that the predefined breaking point gives way due to the action of a force, and the tongue-like sections 1.4.1.1, 1.4.2.1, 1.5.1.1, 1.5.2.1 of the first contact area K1 break off as illustrated in the example of a single cell 1 in FIG. 18.

When the cell assembly 2 is reassembled, the tongue-like sections 1.4.1.2, 1.4.2.2, 1.5.1.2, 1.5.2.2 of the flag-like extensions 1.4.1, 1.4.2, 1.5.1, 1.5.2 of the enveloping metal sheets 1.4, 1.5 of the second contact area K2 for electrically interconnecting adjoining single cells 1 are connected to one another in an integrally bonded manner by ultrasonic welding, as illustrated in greater detail in FIG. 19.

FIGS. 20 and 21 show a cell assembly which is formed from single cells 1 having a metallic housing. In FIG. 20 the cell assembly 2 is shown in a perspective view, and in FIG. 21 is shown in a top view.

Electrical poles 1.2, 1.3 of the single cells 1 are formed or situated on a top side, i.e., on a cell cover 1.7, of the single cell 1.

For the electrical interconnection, the electrical poles 1.2, 1.3 of adjoining single cells 1 are connected by means of cell connectors 4, the cell connectors 4 being fastened in an integrally bonded manner to the electrical poles 1.2, 1.3 of the single cells 1 by welding, in particular laser welding, in the lap welding process. For this purpose, markings are provided on the cell connectors 4, in particular for introducing laser welds, as an assembly aid.

The electrical poles 1.2, 1.3 of the single cells 1 are designed in such a way that they have two adjacently situated redundant contact areas K1, K2. That is, the electrical poles 1.2, 1.3 of the single cells 1 have a width such that two cell connectors 4 may be situated next to one another on the particular electrical pole 1.2, 1.3.

The cell connectors 4 have a web-shaped design, and for the electrical interconnection of adjoining single cells 1 are situated perpendicularly with respect to the longitudinal extent of the single cells 1. The cell connectors 4 have a predefined breaking point, not illustrated in greater detail; alternatively or additionally, the cell connectors 4 are made of a material having a predefined brittleness.

During manufacture of the cell assembly 2, the cell connectors 4 are fastened in an integrally bonded manner to a first contact area K1 of the electrical poles 1.2, 1.3 of adjoining single cells 1.

If a single cell 1 is removed from the cell assembly 2, the cell connectors 4, which are fastened in an integrally bonded manner in the first contact areas K1 of the electrical poles 1.2, 1.3 of the single cell 1, are separated, for example at the predefined breaking point. The predefined breaking point is formed in an area of the cell connector 4 that is situated between the electrical poles 1.2, 1.3 of the adjoining single cells 1.

The cell connectors 4 of the corresponding single cell 1 are separated, with fragments 4.1 of the cell connector 4 remaining in the first contact area K1 of the electrical poles 1.2, 1.3 of the single cell 1 to be replaced, and of the adjoining single cells 1.

A single cell 1 to be replaced is situated within the cell assembly 2 at the free position, whereby new cell connectors 4 for the electrical interconnection of the single cell 1 to the adjoining single cells 1 are fastened in an integrally bonded manner in the second contact area K2 of the electrical poles 1.2, 1.3 of the single cells 1 in question, as shown in FIGS. 22 and 23.

FIG. 22 shows the cell assembly 2 with the replaced single cell 1 which is electrically interconnected by means of the second contact area K2, in a perspective view, and FIG. 23 shows the cell assembly 2 in a top view.

As a result of the cell connectors 4 being separated for removing a single cell 1, and the fragments 4.1 remaining in the first contact area K1 of the electrical poles 1.2, 1.3, damage to the comparatively sensitive electrical poles 1.2, 1.3 of the single cells 1 may be largely prevented.

FIG. 24 shows a perspective view of a cell assembly 2 having single cells 1 designed as pouch cells, and a battery monitoring unit 10 in an exploded illustration, the battery monitoring unit 10 being illustrated as an individual component in FIG. 25.

The battery monitoring unit 10 has an electronics system situated in a housing, the battery monitoring unit 10 being used for measuring cell voltage and for charge balancing between the single cells 1 of the cell assembly 2. For this purpose, the battery monitoring unit 10 is directly or indirectly coupled to each single cell 1 of the cell assembly 2.

The battery monitoring unit 10 is centrally situated with respect to a top side of the cell assembly 2 in the longitudinal extent, and is connected to the single cells 1 via connecting elements 10.1. For this purpose, the battery monitoring unit 10 has a predefinable number of web-shaped connecting elements 10.1, a number of connecting elements 10.1 being situated or formed on each side of the battery monitoring unit 10.

A connecting element 10.1 of the battery monitoring unit 10 is associated, for example, with two adjoining single cells 1, the particular connecting element 10.1 being fastened to a cell connector 4 in an integrally bonded manner by spot welding. In addition, the battery monitoring unit 10 is fastenable, by means of screws 11 via flanges 10.2 formed or situated on the battery monitoring unit, to the pressure plates 9 which close off the cell assembly 2.

The connecting elements 10.1 each have two contact areas K1, K2, which are separated from one another by a predefined breaking point S that is introduced into the particular connecting element 10.1. The predefined breaking point S extends perpendicularly with respect to the longitudinal extent of the particular connecting element 10.1.

During mounting of the battery monitoring unit 10, the connecting elements 10.1 are fastened via their first contact area K1 to the cell connectors 4 in an integrally bonded manner, as illustrated in greater detail in FIGS. 26 and 27. For the integrally bonded fastening by spot welding, an electrode 11 in FIGS. 27 and 30 is used, a welding current being returned via a second electrode, not illustrated in greater detail.

In an area associated with the contact areas K1, K2 of the connecting elements 10.1, in each case two knob-shaped elevations 4.2, shown in FIG. 24, are formed on the cell connectors 4 as weld points for setting a defined current path between the cell connector 4 and the connecting element 10.1. The respective two knob-shaped elevations 4.2 are situated one behind the other with respect to the longitudinal extent of the cell connector 4, so that, in relation to the cell assembly 2, one knob-shaped elevation 4.2 is formed farther to the outside than another knob-shaped elevation 4.2.

During assembly of the battery monitoring unit 10 on the cell assembly 2, the first contact area K1 of the particular connecting element 10.1 is fastened to a knob-shaped elevation 4.2 in an integrally bonded manner.

Alternatively, the knob-shaped elevations 4.2 are formed on the connecting elements 10.1.

For removal of the battery monitoring unit 10, the predefined breaking points S on the connecting elements 10.1 which separate the contact areas K1, K2 are broken using a hold-down device, for example, and the first contact area K1 is removed from the connecting element 10.1, so that the connecting elements 10.1 have only the second contact area K2, as shown in FIG. 28. The first contact areas K1 of the connecting elements 10.1 are preferably removed from the respective cell connector 4.

If the battery monitoring unit 10 is remounted on the cell assembly 2, for example after a repair, as shown in FIG. 29, the second contact areas K2 of the connecting elements 10.1 are used for the integrally bonded fastening to the cell connectors 4.

In the region of the particular first contact area K1, a residue of the knob-shaped elevations 4.2 remains as weld points on the cell connector 4.

If a new battery monitoring unit 10 is mounted on the cell assembly 2, the connecting elements 10.1 are fastened in an integrally bonded manner at their first contact area K1 to the knob-shaped elevations 4.2 situated farther to the inside.

FIG. 30 illustrates an enlarged detail of the integrally bonded fastening of the second contact areas K2 of the connecting elements 10.1 of the battery monitoring unit 10 to the cell connectors 4, using the electrode 11.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

LIST OF REFERENCE NUMERALS/CHARACTERS

1 Single cell
1.1 Plastic casing
1.2 First electrical pole
1.2.1 Tongue-like section
1.2.2 Tongue-like section
1.2.3 Tongue-like section
1.2.4 Tongue-like section 1.2.5 Tongue-like section
1.2.6 Tongue-like section
1.3 Second electrical pole
1.3.1 Tongue-like section
1.3.2 Tongue-like section
1.3.3 Tongue-like section
1.3.4 Tongue-like section
1.3.5 Tongue-like section
1.3.6 Tongue-like section
1.4 First enveloping metal sheet
1.4.1 Flag-like extension
1.4.1.1 Tongue-like section
1.4.1.2 Tongue-like section
1.4.2 Flag-like extension
1.4.2.1 Tongue-like section
1.4.2.2 Tongue-like section
1.5 Second enveloping metal sheet
1.5.1 Flag-like extension
1.5.1.1 Tongue-like section
1.5.1.2 Tongue-like section
1.5.2 Flag-like extension
1.5.2.1 Tongue-like section
1.5.2.2 Tongue-like section
1.6 Frame
1.7 Cell cover
2 Cell assembly
3 Electrode foil system
3.1 Pole contact
4 Cell connector
4.1 Fragment
4.2 Knob-shaped elevation
5 Ultrasonic welding tool
5.1 Sonotrode
5.2 Anvil
6 Holding frame
7 Thermally conductive plate
7.1 Inlet opening
7.2 Outlet opening
8 Tension rod
9 Pressure plate
10 Battery monitoring unit
10.1 Connecting element
10.2 Flange
11 Electrode
K1 First contact area
K2 Second contact area
S Predetermined breaking point

The invention claimed is:

1. A battery, comprising:
a plurality of single cells interconnected in series or in parallel, wherein each of the plurality of single cells includes electrical poles electrically interconnected with electrical poles of other of the plurality of single cells in a positive-fit or integrally bonded manner, wherein the electrical interconnection is by a direct connection or a cell connector;
a battery monitoring unit connected to the electrical poles or to the cell connectors of the plurality of single cells in a positive-fit or integrally bonded manner,
wherein the electrical poles of the plurality of single cells, the cell connectors, and the battery monitoring unit have redundant contact areas for a positive-fit or integrally bonded connection and wherein only one of the contact areas which are redundant with one another is connected in a positive-fit or integrally bonded manner, wherein the redundant contact areas of the electrical poles are each separate structures that are each removable from the electrical poles,
wherein the redundant contact areas of the cell connectors are each separate structures that are each removable from the cell connectors, and
wherein the redundant contact areas of the battery monitoring unit are each separate structures that are each removable from the battery monitoring unit.

2. The battery of claim 1, wherein the electrical poles of each of the plurality of single cells have multiple redundant contact areas in a form of tongue-like sections.

3. The battery of claim 2, wherein the tongue-like sections each have a predefined breaking point.

4. The battery of claim 1, wherein the electrical poles of each of the plurality of single cells have a width such that at least two redundant contact areas are formed next to one another.

5. The battery of claim 1, wherein the cell connectors have a predefined breaking point.

6. The battery of claim 1, wherein the cell connectors are made of a material that has a predefined brittleness.

7. The battery of claim 1, further comprising:
a connecting element situated at the battery monitoring unit and connected to one of the cell connectors and/or one of the electrical poles of one of the plurality of single cells, wherein the connecting element has at least two adjacently situated redundant contact areas separated from one another by a predefined breaking point.

8. A method for servicing, repairing, or optimizing a battery comprising a plurality of single cells interconnected in series or in parallel, wherein each of the plurality of single cells includes electrical poles electrically interconnected with electrical poles of other of the plurality of single cells in a positive-fit or integrally bonded manner, wherein the electrical interconnection is by a direct connection or a cell connector, and a battery monitoring unit connected to the electrical poles or to the cell connectors of the plurality of single cells in a positive-fit or integrally bonded manner, wherein the electrical poles of the plurality of single cells, the cell connectors, and the battery monitoring unit have redundant contact areas for a positive-fit or integrally bonded connection, wherein only one of the contact areas which are redundant with one another is connected in a positive-fit or integrally bonded manner, wherein the redundant contact areas of the electrical poles are each separate structures that are each removable from the electrical poles, wherein the redundant contact areas of the cell connectors are each separate structures that are each removable from the cell connectors, and wherein the redundant contact areas of the battery monitoring unit are each separate structures that are each removable from the battery monitoring unit, the method comprising:
replacing a component with another component by separating the positive-fit or integrally bonded connection of one of the redundant contact areas of a component which is not to be replaced, via which the component which is to be replaced and the component which is not to be replaced are electrically contacted with one another, by destruction and a replacement component is connected in a positive-fit or integrally bonded manner to the contact area which is redundant with the destroyed contact area, or a faulty positive-fit or integrally bonded connection of two contact areas is replaced or supplemented by a positive-fit or integrally bonded connection of two contact areas which are redundant with the faulty positive-fit or integrally bonded connection of two contact areas.

9. The method of claim 8, wherein the replacement component is integrally bonded or connected in a positive-fit manner to the redundant contact area by welding, tox clinching, clinching, crimping, or riveting.

\* \* \* \* \*